United States Patent
Cao

(10) Patent No.: US 11,424,808 B2
(45) Date of Patent: Aug. 23, 2022

(54) ELECTRONIC DEVICE, METHOD AND MEDIUM FOR WIRELESS COMMUNICATION

(71) Applicant: Sony Corporation, Tokyo (JP)

(72) Inventor: Jianfei Cao, Beijing (CN)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/621,244

(22) PCT Filed: Aug. 7, 2018

(86) PCT No.: PCT/CN2018/099138
§ 371 (c)(1),
(2) Date: Dec. 11, 2019

(87) PCT Pub. No.: WO2019/029515
PCT Pub. Date: Feb. 14, 2019

(65) Prior Publication Data
US 2020/0136711 A1 Apr. 30, 2020

(30) Foreign Application Priority Data
Aug. 11, 2017 (CN) .......................... 201710684311.8

(51) Int. Cl.
*H04B 7/06* (2006.01)
*H04B 7/0408* (2017.01)

(52) U.S. Cl.
CPC ......... *H04B 7/0695* (2013.01); *H04B 7/0408* (2013.01); *H04B 7/0626* (2013.01); *H04B 7/0691* (2013.01)

(58) Field of Classification Search
CPC .. H04B 7/0691; H04B 7/0695; H04B 7/0689; H04B 7/0626; H04B 7/0632; H04B 7/0408
See application file for complete search history.

(56) References Cited

U.S. PATENT DOCUMENTS 9,497,002 B2 * 11/2016 Wei ..................... H04B 7/0456
10,382,115 B2 * 8/2019 Cheng ................. H04B 7/0626
(Continued)

FOREIGN PATENT DOCUMENTS

| CN | 101689712 A | 3/2010 |
|----|-------------|--------|
| CN | 102598533 A | 7/2012 |

(Continued)

OTHER PUBLICATIONS

International Search Report and Written Opinion dated Oct. 15, 2018 for PCT/CN2018/099138 filed on Aug. 7, 2018, 8 pages including English Translation of the International Search Report.
(Continued)

*Primary Examiner* — Betsy Deppe
(74) *Attorney, Agent, or Firm* — Xsensus LLP

(57) ABSTRACT

An electronic device comprises processing circuitry configured to perform control to: transmit one or more beams via one or more groups of antenna panels; receive beam state indication of the one or more beams from a target communication apparatus; and determine one or more antenna panels serving the target communication apparatus in a group of antenna panels comprising an antenna panel corresponding to the beam state indication.

12 Claims, 17 Drawing Sheets

(56) References Cited

U.S. PATENT DOCUMENTS

| | | |
|---|---|---|
| 10,511,370 B2* | 12/2019 | Chang .............. H04L 25/0204 |
| 2013/0301454 A1 | 11/2013 | Seol et al. |
| 2017/0047977 A1 | 2/2017 | Kim |
| 2017/0238297 A1* | 8/2017 | Benjebbour ......... H04B 7/0404 370/329 |
| 2019/0028167 A1* | 1/2019 | Chang ................ H04B 7/0413 |

FOREIGN PATENT DOCUMENTS

| | | |
|---|---|---|
| CN | 105959966 A | 9/2016 |
| WO | 2017/067138 A1 | 4/2017 |

OTHER PUBLICATIONS

Extended European Search Report dated Oct. 16, 2020, issued in corresponding European Patent Application No. 18844192.7, 13 pages.

* cited by examiner

0200

ELECTRONIC DEVICE, METHOD AND MEDIUM FOR WIRELESS COMMUNICATION

CROSS-REFERENCE TO RELATED APPLICATIONS

This application is based on PCT filing PCT/CN2018/099138, filed Aug. 7, 2018, which claims priority to Chinese Patent Application No. 201710684311.8, filed Aug. 11, 2017, the entire contents of each are incorporated herein by reference.

TECHNICAL FIELD

The present disclosure relates generally to electronic devices, methods, and media for wireless communication. More specifically, the present disclosure relates to electronic devices, methods, and media for wireless communication using a group of antenna panels.

BACKGROUND

Currently, the standardization organization 3GPP is developing 5G technical standards. As the frequency band used increases (such as the 26 GHz, 60 GHz or higher frequency band), the wireless channel will inevitably withstand greater negative effects of path loss, atmospheric absorption loss, etc., than the lower frequency band (such as 2 GHz). These negative effects are invariably applied to the physical channels in 5G.

In order to solve the problems of high frequency band channels, 3GPP introduced Massive MIMO technology to compensate for the fading loss existing in high frequency band channels by Analog Beamforming Gain. Specifically, Massive MIMO can provide sufficient transmit and receive beamforming gains at both of the transmit end and the receive end to compensate for path loss in the high frequency band. However, the enhancement of the beamforming gain results in narrower beam coverage because the limited energy of the wireless signal is concentrated in the spatial direction with stronger directivity. Therefore, 3GPP introduced the concept of Beam Management in the development of 5G standards. One of important processes is Beam Sweeping, which aims to enable Base Station (BS) and User Equipment (UE) to know their own suitable transmit or receive beam by transmitting and receiving reference signals on different beams. To be simple, in a certain period of time, the base station or the UE can traverse a group of radio frequency beams to test the transmit and receive beams with better channel conditions, and base on this, to establish a Beam Pair Link (BPL) between the base station and the UE.

In 4G LTE, an antenna panel, or referred to as an antenna array, is disposed at the base station, and all antenna units on this antenna panel are used for beamforming for the UE as shown in FIG. 1A. In addition, in 4G LTE, beams emitted from the base station are wider, so that all antennas of the UE can be covered.

Unlike 4G LTE, in 5G NR (New Radio), multiple antenna panels are disposed at the base station. In addition, due to the use of high frequency radio resources, the base station and the UE need to use narrow beams for beam pairing, so beams sent out from the base station may not cover all antennas of the UE, as shown in FIG. 1B.

In addition, in 5G NR, multiple antenna panels of the base station can be divided into one or more groups of antenna panels, for example a Quasi Co-location (QCL) group. Therefore, considering the grouping situation of antenna panels, it is necessary to design a new scheme to establish a beam pair link between the base station and the UE, to estimate channels, and to determine a transmission scheme, etc.

SUMMARY

To address one or more of above issues, the present disclosure provides an electronic device, method, and medium for wireless communication using a group of antenna panels.

According to one aspect of the present disclosure, there is provided an electronic device for wireless communication, comprising processing circuitry configured to perform control to: transmit one or more beams via one or more groups of antenna panels; receive beam state indication of the one or more beams from a target communication apparatus; and determine one or more antenna panels serving the target communication apparatus in a group of antenna panels comprising an antenna panel corresponding to the beam state indication.

According to another aspect of the present disclosure, there is provided an electronic device for wireless communication, comprising processing circuitry configured to perform control to: receive, from a target communication apparatus, one or more beams transmitted via one or more groups of antenna panels; transmit, to the target communication apparatus, beam state indication of the one or more beams based on channel state of the one or more beams, wherein one or more antenna panels in a group of antenna panels comprising an antenna panel corresponding to the beam state indication are determined by the target communication apparatus to serve the electronic device.

According to another aspect of the present disclosure, there is provided an electronic device for wireless communication, comprising processing circuitry configured to perform control to: receive, from a target communication apparatus, one or more beams transmitted via one or more groups of antenna panels, wherein each beam is formed by coherent transmission performed by one or more antenna panels in one group of antenna panels; and transmit transmission suggestion to the target communication apparatus based on channel state of the one or more beams, wherein the transmission suggestion comprises one of Spatial Multiplexing, Multiple Input Single Output, Single Input Single Output, Single Input and Multiple Output, and Parallel Transmission.

According to another aspect of the present disclosure, there is provided a method for wireless communication, comprising: transmitting one or more beams via one or more groups of antenna panels; receiving beam state indication of the one or more beams from a target communication apparatus; and determining one or more antenna panels serving the target communication apparatus in a group of antenna panels comprising an antenna panel corresponding to the beam state indication.

According to another aspect of the present disclosure, there is provided a method for wireless communication, comprising: receiving, from a target communication apparatus, one or more beams transmitted via one or more groups of antenna panels; transmitting, to the target communication apparatus, beam state indication of the one or more beams based on channel state of the one or more beams, wherein one or more antenna panels in a group of antenna panels comprising an antenna panel corresponding to the beam state indication are determined by the target communication apparatus to serve the electronic device.

According to another aspect of the present disclosure, there is provided a method for wireless communication, comprising: receiving, from a target communication apparatus, one or more beams transmitted via one or more groups of antenna panels, wherein each beam is formed by coherent transmission performed by one or more antenna panels in one group of antenna panels; and transmitting transmission suggestion to the target communication apparatus based on channel state of the one or more beams, wherein the transmission suggestion comprises one of Spatial Multiplexing, Multiple Input Single Output, Single Input Single Output, Single Input and Multiple Output, and Parallel Transmission.

According to another aspect of the present disclosure, there is provided a computer-readable storage medium with instructions stored thereon which when executed by a processor cause the processor to perform any one of above methods.

The above summary is provided to summarize some exemplary embodiments in order to provide a basic understanding of the various aspects of the subject matter described herein. Therefore, above features are merely examples and should not be construed as reducing the scope or spirit of the subject matter described herein in any ways. Other features, aspects, and advantages of the subject matter described herein will become apparent from the Detailed Description described below in conjunction with the drawings.

BRIEF DESCRIPTION OF THE DRAWINGS

A better understanding of the present disclosure can be obtained when following detailed description of the embodiments is considered in conjunction with accompanying drawings. The same or similar reference numerals are used in the drawings to refer to the same or similar parts. The drawings, together with the specific description below, are included in and forms part of the specification, and are used to illustrate the embodiments of the present disclosure and explain the principles and advantages of the present disclosure.

Figure 1A:
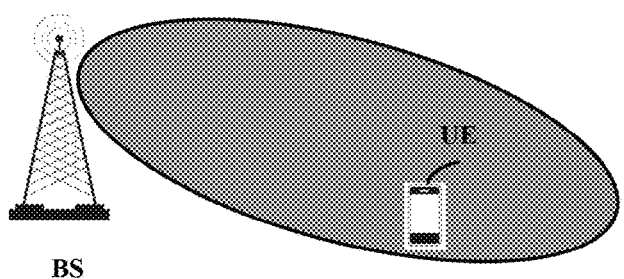
FIG. 1A illustrates a schematic diagram of performing beamforming in 4G LTE.
Figure 1B:
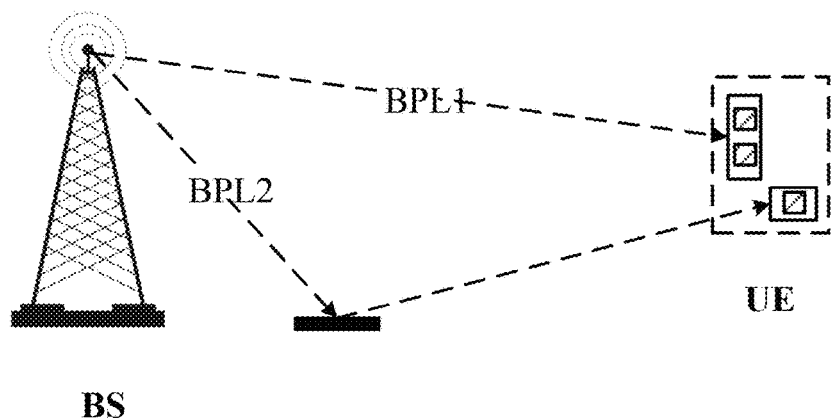
FIG. 1B illustrates a schematic diagram of performing beamforming in 5G NR.

While embodiments described in the present disclosure are susceptible to various modifications and alternative forms, the specific embodiments thereof are illustrated in the drawings as examples and are described in detail herein. It should be understood, however, the drawings and the detailed description thereof are not intended to limit the embodiments to the specific forms disclosed, rather, it is intended to cover all modifications, equivalents and alternatives falling within the spirit and scope of the claims.

DETAILED DESCRIPTION

Exemplary embodiments of the present disclosure will be described hereinafter with reference to the accompanying drawings. For clarity and conciseness, not all features of the actual implementations are described in the specification. However, it should be clear that implementation specific decisions must be made during the development of any such actual embodiment in order to achieve the developer's specific goals. For example, compliance with system and business related restrictions, and these restrictions may vary from implementation to implementation. Moreover, it should also be clear that while development work may be more complicated and time consuming, such development work is merely a routine task for those skilled in the art in light of the benefit of this disclosure.

In order to avoid obscuring the present disclosure with unnecessary detail, only the device structure and/or operational steps closely related to the solution according to the present disclosure are shown in the drawings, while other details that are not so relevant to the present disclosure are omitted.

System Configuration

Figure 2:
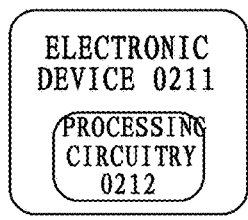
FIG. 2 illustrates a schematic diagram of a communication system in accordance with an embodiment of the present disclosure.
Figure 2:
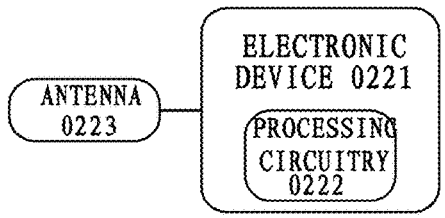

FIG. 2 illustrates a schematic diagram of a communication system 0200 in accordance with an embodiment of the present disclosure. The communication system 0200 may include communication apparatus 0210 and communication apparatus 0220 in wireless communication with each other. Although one communication apparatus 0210 is shown in communication with one communication apparatus 0220 in FIG. 2, the communication apparatus 0210 can communicate with multiple communication apparatus 0220, and the communication apparatus 0220 can communicate with multiple communication apparatus 0210 (e.g., in the case of multipoint cooperation).

The communication apparatus 0210 may include an electronic device 0211 and an antenna 0213. In addition, the communication apparatus 0210 may also include other components not shown, such as a radio frequency link, a baseband processing unit, a network interface, a processor, a memory, a controller, and the like. The electronic device 0211 can be associated with the antenna 0213. For example, the electronic device 0211 may be connected to the antenna 0213 directly or indirectly (e.g., other components may be connected in between), transmit a radio signal via the antenna 0213, and receive a radio signal via the antenna 0213.

The electronic device 0211 may include a processing circuitry 0212. In addition, the electronic device 0211 may further include an input and output interface, a memory, and the like. The processing circuitry 0212 in the electronic device 0211 may output signals (digital or analog) to other components in communication apparatus 0210, as well as receive signals (digital or analog) from other components in communication apparatus 0210. Moreover, processing circuitry 0212 can also control some or all of the operations of other components in communication apparatus 0210.

The processing circuitry 0212 may be in the form of a general purpose processor or a dedicated processing circuitry such as an ASIC as well. For example, the processing circuitry 0212 can be constructed by circuitry (hardware) or a central processing device (such as a central processing unit (CPU)). Additionally, the processing circuitry 0212 can carry thereon programs (software) for operating the circuitry (hardware) or the central processing device. The program can be stored in a memory (such as arranged in the communication apparatus 0210 or the electronic device 0211) or in an external storage medium connected from the outside, and downloaded via network (such as Internet).

Although the electronic device 0211 is shown separated from the antenna 0213 in FIG. 2, the electronic device 0211 may also be implemented to include the antenna 0213. Furthermore, the electronic device 0211 may also be implemented to include one or more other components in the communication apparatus 0210, or the electronic device 0211 can be implemented as the communication apparatus 0210 itself. In actual implementation, the electronic device 0211 can be implemented as a chip (such as an integrated circuit module including a single wafer), a hardware component, or a complete product.

The communication apparatus 0220 may include an electronic device 0221 and an antenna 0223, and the electronic device 0221 includes a processing circuitry 0222. Furthermore, the above description of the structure of the communication apparatus 0210 is equally applicable to the communication apparatus 0220, and details are not repeated herein again.

The communication system 0200 may be a cellular communication system, a Machine Type Communication (MTC) system, an ad hoc network, or a cognitive radio system (for example, IEEE P802.19.1a and Spectrum Access System (SAS)) etc.

The communication apparatus 0210 can be implemented as a base station (BS), a small base station, a Node B, an e-NodeB, a g-NodeB, a relay, etc. in a cellular communication system, a terminal device in a Machine Type Communication system, a sensor nodes in an ad hoc network, a Coexistence Manager (CM), SAS, etc. in a cognitive radio system. For example, the communication apparatus 0210 can be implemented as any type of evolved Node B (eNB), such as a macro eNB (associated with a macro cell) and a small eNB (associated with a small cell). The small eNB can be an eNB covering a cell smaller than the macro cell, such as a pico eNB, a micro eNB, and a home (femto) eNB. Alternatively, the communication apparatus 0210 can be implemented as any other type of base station, such as a network node in a next generation network such as gNB, NodeB, and base transceiver station (BTS). The communication apparatus 0210 may include: a body (also referred to as a base station device) configured to control wireless communication; and one or more remote radio heads (RRHs) disposed at a different location from the body. In addition, various types of terminals which will be described later all can operate as the communication apparatus 0210 by performing base station functions temporarily or semi-persistently.

The communication apparatus 0220 can be implemented as a terminal device or a User Equipment (UE). For example, the communication apparatus 0220 can be implemented as a mobile terminal (such as a smart phone, a tablet personal computer (PC), a notebook PC, a portable game terminal, a portable/dongle type mobile router, and a digital camera apparatus) or an in-vehicle terminal (such as a car navigation device). The communication apparatus 0220 can also be implemented as a terminal that performs machine-to-machine (M2M) communication (also referred to as a machine type communication (MTC) terminal). Further, the communication apparatus 0220 can be a wireless communication module (such as an integrated circuit module including a single wafer) mounted on each of the above terminals. The communication apparatus 0220 can also be implemented as a smart electricity meter, a smart home appliance, or a Geolocation Capability Object (GCO) or a Citizens Broadband Radio Service Device (CBSD) in a cognitive radio system.

For simplicity of description, the processing of the communication apparatus 0210 and 0220 will be described below assuming that the communication apparatus 0210 is a base station and the communication apparatus 0220 is a user equipment, and the communication from the communication apparatus 0210 to the communication apparatus 0220 is referred to as downlink, and the communication from the communication apparatus 0220 to the communication apparatus 0210 is referred to as uplink. Note that, in the case that the communication apparatus 0210 is not a base station and the communication apparatus 0220 is not user equipment, the communication apparatus 0210 and 0220 can also perform the processes described below. Moreover, some or all of the processes performed by the communication apparatus 0210 and 0220 described below may be performed by the processing circuitries 0212 and 0222, and may also be performed by controlling other components in the communication apparatus 0210 and 0220 and/or components in other apparatus by processing circuitries 0212 and 0222.

Figure 3:
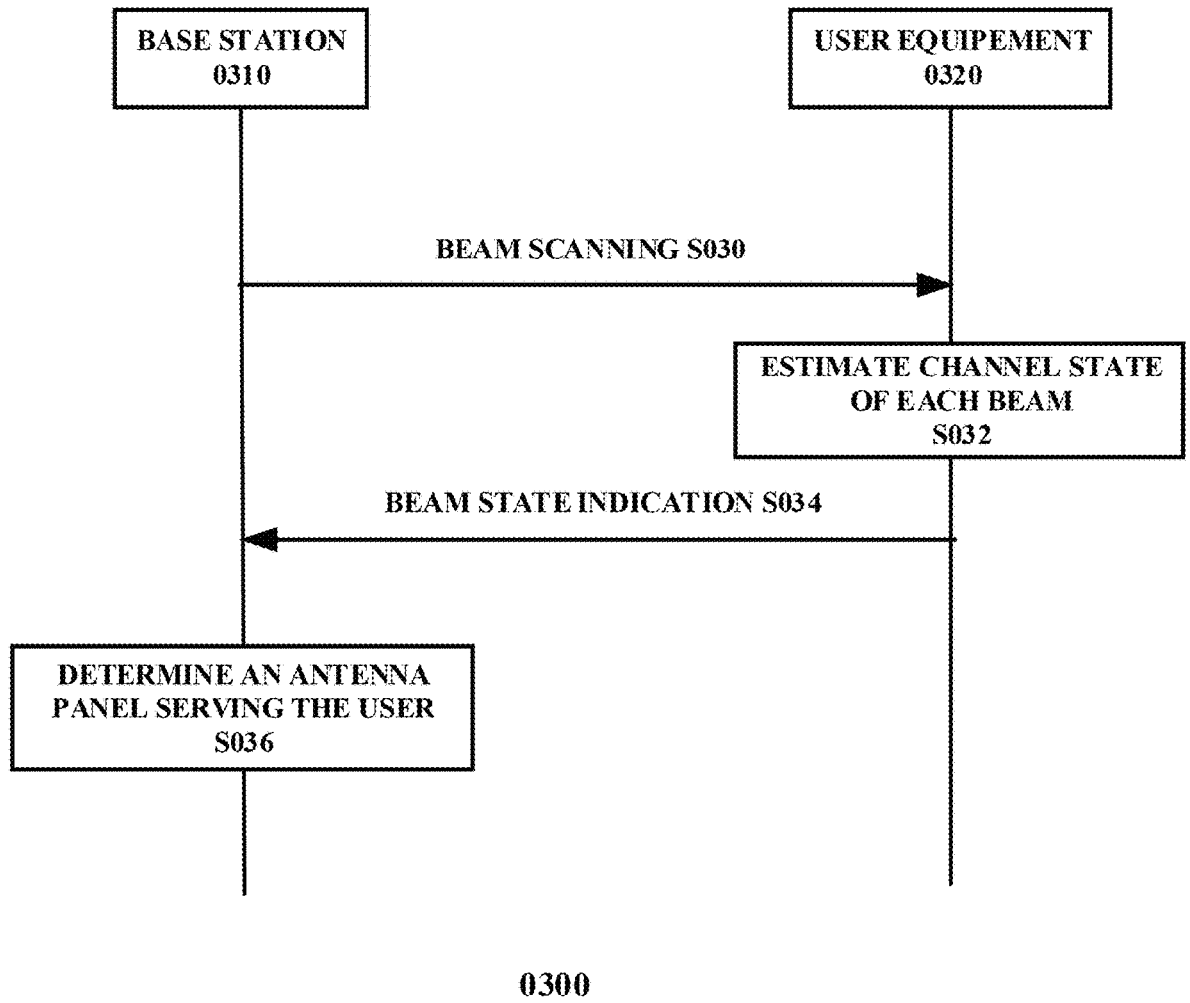
FIG. 3 illustrates a flow of communication between a base station and a user equipment in accordance with one or more embodiments.

FIG. 3 illustrates a flow 0300 of communication between a base station 0310 and a user equipment 0320, in accordance with one or more embodiments. At step S030, the base station 0310 transmits one or more beams through one or more groups of antenna panels for beam scanning. The one or more beams have different directivities and thus experience different channel environments, and reception states at the user equipment 0320 will also be different. At step S032, user equipment 0320 receives the one or more beams and estimates channel states of respective beams. The user equipment 0320 can estimate channel state of each beam based on a reference signal on the beam, such as channel quality, channel direction, and the like. At step S034, the user equipment 0320 transmits beam state indication of the one or more beams to the base station 0310 based on channel state of the one or more beams. For example, the user equipment 0320 may include indication of one or more optimal beams in the beam state indication to indicate one or more beams having the best reception quality. At step S036, after receiving the beam state indication of the one or more beams, the base station 0310 determines one or more antenna panels serving a target communication apparatus in a group of antenna panels comprising an antenna panel corresponding to the beam state indication. For example, base station 0310 may first determine a beam having the best reception quality at user equipment 0320 based on the beam state indication. The base station 0310 can determine the beam as a beam for communicating with the user equipment 0320. And, the base station 0310 can determine the antenna panel that emits the beam in the beam scanning step. Then, the base station 0310 can determine one or more antenna panels in a group of antenna panels comprising the antenna panel as antenna panels to serve the user equipment 0320 next.

After determining one or more antenna panels serving the user equipment 0320, the base station 0310 and the user equipment 0320 can also perform further communications, as will be described in detail later.

The Configuration of a Group of Antenna Panels

The antenna of base station 0310 may be comprised of one or more antenna panels, each having a plurality of antenna units thereon. The one or more antenna panels can be divided into one or more groups of antenna panels, for example, Quasi Co-location (QCL) group, based on whether Coherent Transmission (Coherent Tx) can be performed between the one or more antenna panels. In practice, the capability to perform coherent transmission between multiple antenna panels can be achieved by calibrating and clock synchronization of the multiple antenna panels. Thus, individual antenna panels in the same group of antenna panels can jointly transmit signals to user equipment 0320 for performing coherent transmission. For example, baseband pre-coding of a multi-stream signal can be implemented jointly between multiple antenna panels in the same group of antenna panels. In addition, the same group of antenna panels can also serve multiple user equipments at the same time. For example, a portion of antenna panels serve one user equipment and another portion of antenna panels serve another user equipment. In some practices, antennas of a base station may include multiple antenna panels of different manufacturers/models/specifications and cannot support coherent transmissions so that multiple groups of antenna panels exist.

Figure 4:
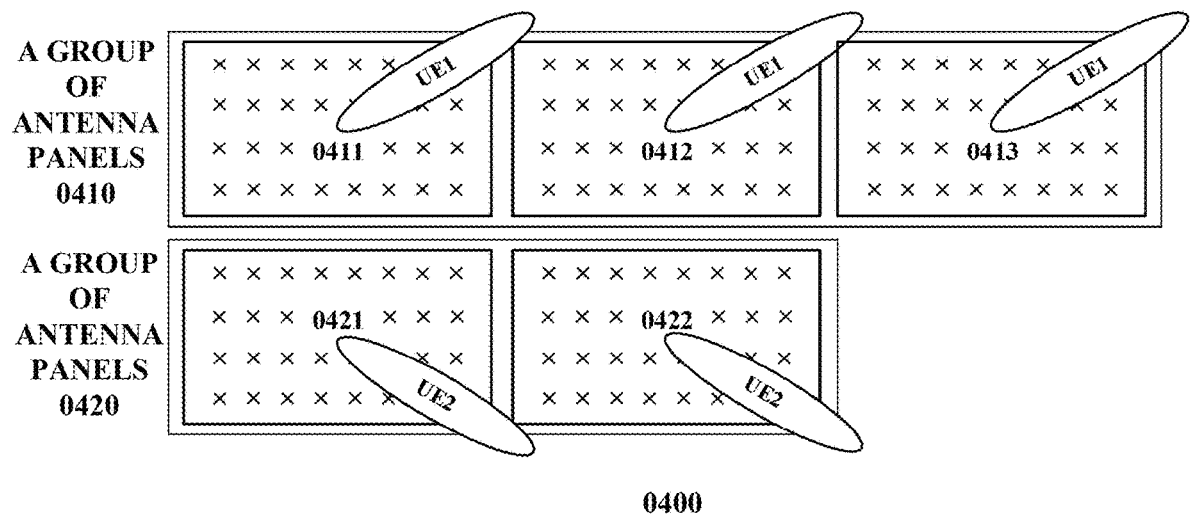
FIG. 4 illustrates a configuration of an exemplary group of antenna panels in accordance with one or more embodiments.

FIG. 4 illustrates a configuration 0400 of an exemplary group of antenna panels in accordance with one or more embodiments. In FIG. 4, five antenna panels 0411, 0412, 0413, 0421, 0422 are included. Where, the antenna panels 0411, 0412, and 0413 are in a group of antenna panels 0410, and the antenna panels 0421 and 0422 are in a group of antenna panels 0420. In FIG. 4, the antenna panels 0411, 0412, 0413 are capable of performing coherent transmissions, jointly transmitting signals to user equipment 1 (UE1). The antenna panels 0421 and 0422 are also capable of performing coherent transmissions, jointly transmitting signals to user equipment 2 (UE2). While coherent transmission cannot be performed between the antenna panels (0411, 0412, 0413) in the group of antenna panels 0410 and the antenna panels (0421, 0422) in the group of antenna panels 0420.

It is worth noting that the configuration 0400 shown in FIG. 4 is only an example. Depending on actual situation, antennas at base station 0410 and/or user equipment 0420 can have any number of groups of antenna panels, and each group of antenna panels can have any number of antenna panels. In addition, the number of antenna panels of different groups of antenna panels may be the same or different.

Beam Scanning

Beam scanning refers to the use of beamforming technology to form several beams with different directivities in space to determine the receiving state of each beam and in turn pick these beams so as to establish a beam pair link between a base station and user equipment.

Beamforming allows each transmit beam and/or receive beam to be limited to a particular directivity and beam coverage, with the coverage of each beam being narrower than the full width beam and the gain of beam increasing. In some examples of physical implementation, a communication apparatus at transmitting end has a plurality of radio frequency links, each of which is connected to multiple antenna units and their phase shifters, and the signals on each of the radio frequency links are superimposed and transmitted into the air through multiple antenna units with different phases, thereby forming a transmit beam. The control unit of the communication apparatus at transmitting end determines phase values of corresponding multiple antenna units according to the target transmitting beam direction, and configures respective phase shifters, thereby controlling the transmit beamforming. Accordingly, a communication apparatus at receiving end has one or more radio frequency links, each of which is connected to multiple antenna units and their phase shifters, and radio signals in the air are superimposedly received into radio frequency links through multiple antenna units having different phases, thereby forming a receive beam. The control unit of the communication apparatus at receiving end determines phase values of corresponding multiple antenna units according to the target receiving beam direction, and configures respective phase shifters, thereby controlling the receiving beamforming. In some examples, the control unit of the communication apparatus configures phase shifters of multiple antenna units of each radio frequency link according to a predetermined codebook, the codebook comprising a plurality of codewords, each codeword corresponding to one beam direction, indicating one phase combination of phase shifters.

In beamforming, due to the strong directivity of antenna transmission and/or reception, matching transmit and receive beams are required in the downlink or uplink to ensure beamforming gain, the matched transmit beam and receive beam form a beam pair link. Therefore, such matched transmit and receive beams in the downlink or uplink can be collected and maintained, that is, performing beam scanning. The beam scanning may include transmit beam scan and receive beam scan, which refer to, respectively, transmit and receive different beams in a predetermined manner over a period of time to cover certain spatial region, thereby finding out transmit and receive beams suitable for certain directional spatial region. Taking the downlink as an example, since one user equipment is usually located in a specific direction of a base station, there is usually only one (or more) specific transmit beams on the base station side suitable for communicating with the user equipment. There is also usually one (or more) receive beams that mate with the specific transmit beams on the user equipment side. The user equipment can report the specific transmit beams on the base station side with which it mates to the base station through the scan result report.

Figure 5:
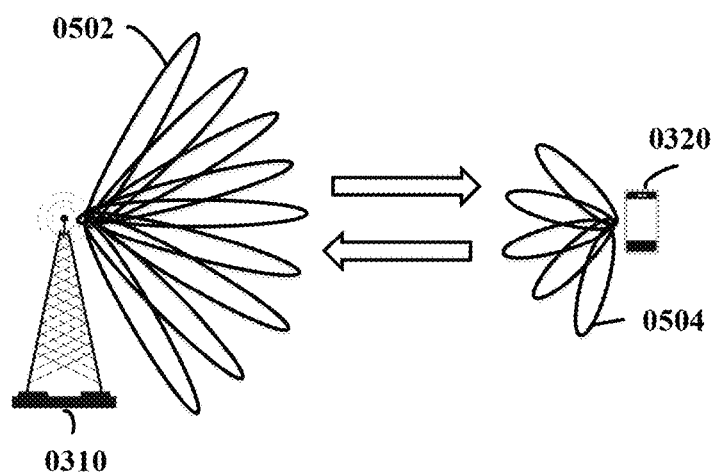
FIG. 5 illustrates beam scanning process for a single antenna panel in a wireless communication system.

FIG. 5 illustrates an example beam scanning process for a single antenna panel in a wireless communication system. The rightward arrow in FIG. 5 indicates the downlink direction from the base station 0310 to the user equipment 0320, and the leftward arrow indicates the uplink direction from the user equipment 0320 to the base station 0310. As shown in FIG. 5, the base station 0310 includes $n_{t\_DL}$ downlink transmit beams ($n_{t\_DL}$ is a natural number greater than or equal to 1, exemplified as $n_{t\_DL}=9$ in FIG. 5), and the user equipment 0320 includes $n_{r\_DL}$ downlink receive beams ($n_{r\_DL}$ is a natural number greater than or equal to 1, exemplified as $n_{r\_DL}=5$ in FIG. 5). In addition, in the wireless communication system shown in FIG. 5, the number of uplink receive beams of the base station 0310, $n_{r\_UL}$, and the coverage of each beam are the same as those of downlink transmit beams, and the number of uplink transmit beams of the user equipment 0320, $n_{t\_UL}$, and the coverage of each beams are the same as those of the downlink receive beam. It should be understood that, depending on system requirements and settings, the coverage and the number of uplink receive beams and downlink transmit beams of the base station may be different, so as the user equipment.

As shown in FIG. 5, in the downlink beam scanning process, each downlink transmit beam 0502 of the $n_{t\_DL}$ downlink transmit beams of the base station 0310 transmits $n_{r\_DL}$ downlink reference signals to the user equipment 0320, and the user equipment 0320 receives the $n_{r\_DL}$ downlink reference signals through $n_{r\_DL}$ downlink receive beams respectively. In this manner, the $n_{t\_DL}$ downlink transmit beams of the base station 0310 sequentially transmit $n_{t\_DL} \times n_{r\_DL}$ downlink reference signals to the user equipment 0320, and each downlink receive beam 0504 of the user equipment 0320 receives $n_{t\_DL}$ downlink reference signals, that is, the $n_{r\_DL}$ downlink receive beams of the user equipment 0320 receive a total of $n_{t\_DL} \times n_{r\_DL}$ downlink reference signals from the base station 0310. The user equipment 0320 measures the $n_{t\_DL} \times n_{r\_DL}$ downlink reference signals (for example, measures the received signal power (e.g., RSRP) of the downlink reference signals), thereby determining the strongest downlink transmit beam of the base station 0310 and the strongest downlink receive beam of the user equipment 0320.

In the uplink beam scanning process, similar to the downlink beam scanning, each uplink transmit beam 0504 of the $n_{t\_uL}$ uplink transmit beams of the user equipment 0320 transmits $n_{r\_UL}$ uplink reference signals to the base station 0310, and the base station 0310 receives the $n_{r\_UL}$ uplink reference signals through $n_{r\_UL}$ uplink receive beams respectively. In this manner, the $n_{t\_uL}$ uplink transmit beams of the user equipment 0320 sequentially transmit $n_{t\_uL} \times n_{r\_UL}$ uplink reference signals to the base station 0310, and each uplink receive beam 0502 of the base station 0310 receives $n_{t\_uL}$ uplink reference signals, that is, $n_{r\_UL}$ uplink receive beams of the base station 0310 receive a total of $n_{r\_UL} \times n_{t\_uL}$ uplink reference signals from the user equipment 0320. The base station 0310 measures the $n_{r\_UL} \times n_{t\_UL}$ uplink reference signals (for example, measures the received signal power (e.g., RSRP) of the uplink reference signals), thereby determining the strongest uplink transmit beam of the user equipment 0320 and the strongest uplink receive beam of the base station 0310.

It should be understood that the coverage and the number of uplink receive beams and downlink transmit beams of the base station may be different, and the coverage and the number of uplink transmit beams and downlink receive beams of the user equipment may be different, while foregoing determining operation may still be similarly carried out.

After the downlink beam scanning and uplink beam scanning processes are completed, the transmission of data and/or control signals is performed next using the determined strongest transmit and receive beams of the base station and the strongest transmit and receive beams of the user equipment. The above processes of determining the strongest transmit and receive beams of base station and user equipment through beam scanning is sometimes also referred to as beam training process.

In 4G LTE, since there is only one antenna panel, there is no need to consider how to mate multiple antenna panels in beam scanning. However, if there are multiple antenna panels (for example, in 5G NR technology), then a new scheme needs to be designed to realize beam scanning and to consider how to mate between the multiple antenna panels. The beam scanning in the case that the base station 0310 includes several groups of antenna panels according to one or more embodiments of the present disclosure will be described below.

Figure 6A:
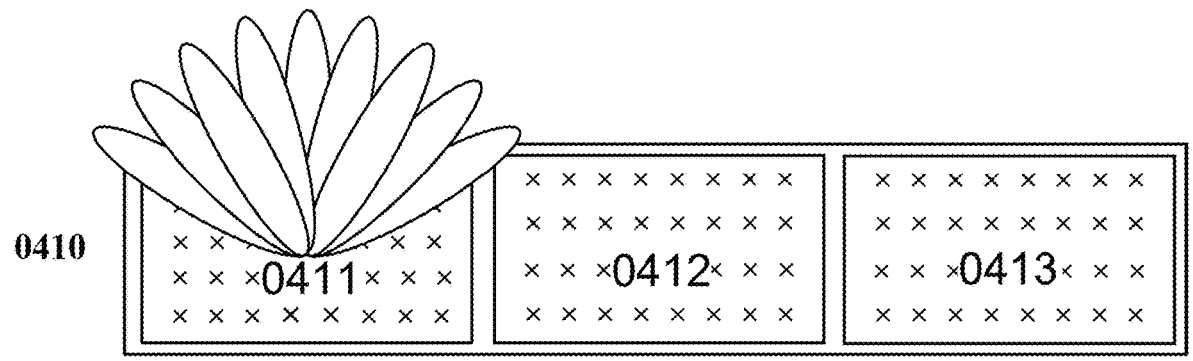
FIGS. 6A and 6B illustrate a beam scanning scheme in accordance with one or more embodiments.
Figure 6B:
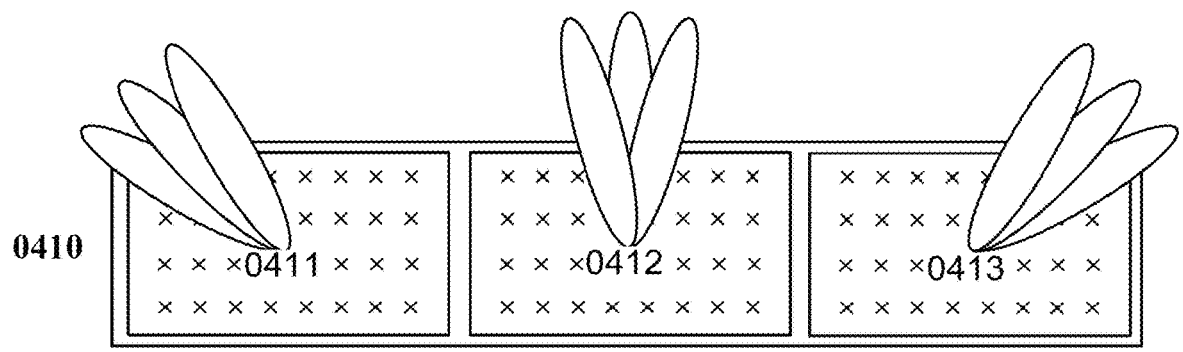

FIGS. 6A and 6B illustrate a beam scanning scheme in accordance with one or more embodiments. In FIGS. 6A and 6B, it is assumed that the antenna panels 0411, 0412, 0413 constitute one group of antenna panels 0410, and it is assumed that the group of antenna panels 0410 needs to scan nine beam directions to realize beam scanning, that is, to transmit scanning beams in nine different directions.

In the scheme of FIG. 6A, each antenna panel in a group of antenna panels 0410 transmits the nine scanning beams as shown in FIG. 6A. In FIG. 6A, the antenna panel 0411 transmits nine scanning beams, and the antenna panels 0412, 0413 also transmit the nine scanning beams (not shown). In this case, each antenna panel has transmitted all of the nine scanning beams, that is, each antenna panel has scanned nine beam directions. That is to say, a collection of beams transmitted by each antenna panel is able to accomplish beam scanning of the group of antenna panels comprising each antenna panel. However, depending on needs, in some cases, one or more antenna panels in the group of antenna panels 0410 may not transmit all nine scan beams.

In the scheme of FIG. 6B, a collection of beams to be transmitted by the group of antenna panels 0410 to accomplish beam scanning is divided into multiple subsets, such that different subsets of the multiple subsets are transmitted by different antennas panels in the group of antenna panels 0410. For example, in FIG. 6B, the nine scanning beams that need to be transmitted by the group of antenna panels 0410 are allocated to three non-overlap (no intersection) subsets, so that the antenna panels 0411, 0412, and 0413 transmit the three subsets respectively to accomplish beam scanning of the group of antenna panels 0410.

The above division of beams into subsets may be in any form of division. The number of beams in each subset can be equal. In other words, the nine scanning beams that the group of antenna panels 0410 needs to transmit are equally allocated to the antenna panels 0411, 0412, 0413. Depending on the needs, however, the number of beams in each subset may be unequal, that is, the nine scanning beams that the group of antenna panels 0410 needs to transmit may be unequally allocated to the antenna panels 0411, 0412, 0413.

The number of subsets may be equal to the number of antenna panels in the group of antenna panels 0410. In this case, each antenna panel transmits one subset. The number of subsets may also be less than the number of antenna panels in the group of antenna panels 0410. In this case, one or more subsets may be transmitted through multiple antenna panels, for example, transmitted jointly by multiple antenna panels. In addition, the number of subsets may also be greater than the number of antenna panels in the group of antenna panels 0410. In this case, there may be at least one antenna panel in the group of antenna panels 0410 to transmit multiple subsets.

Therefore, in the beam scanning phase, it is not necessary to transmit all nine scanning beams by each of antenna panel. In contrast, the transmission of nine scanning beams is accomplished by distribution and cooperation among different antenna panels in the group of antenna panels 0410. Thus, the time occupied by beam scanning can be effectively saved, and the beam scanning efficiency is improved.

In addition, there may be intersections among collections of beams transmitted by respective antenna panels, for example, a portion of the beams transmitted by the antenna panels 0411, 0412 may have the same direction. Even in the presence of an intersection, the direction of at least one beam transmitted by one antenna panel in the group of antenna panels 0410 may be different from the direction of at least one beam transmitted by the other antenna panel, and a collection of beams transmitted by all antennas in the group of antenna panels 0410 is able to accomplish beam scanning of the group of antenna panels 0410. Therefore, even if there is overlap among beams transmitted by different antenna panels in the group of antenna panels 0410, since it is not necessary to cause all the antenna beams in the group of antenna panels 0410 to transmit all nine scanning beams, time-frequency resources occupied by beam scanning can also be effectively saved.

Transmission of Beam Configuration Information

The base station 0310 may transmit beam configuration information to the user equipment 0320 prior to performing beam scanning. For example, one or more of the number of beams transmitted by respective antenna panels in a group of antenna panels, the direction of a beam, time-frequency resources occupied by reference signals, and the index of a port used may be included in the beam configuration information.

In the example of FIG. 6A, each antenna panel needs to transmit 9 scanning beams, so the user equipment 0320 needs to receive the 9 scanning beams with 9 beam receiving periods. In the example of FIG. 6B, each antenna panel only needs to transmit 3 scanning beams, so the user equipment 0320 only needs to receive the 3 scanning beams with 3 beam receiving periods. Therefore, the base station 0310 transmitting the beam configuration information to the user equipment 0320 prior to performing beam scanning may enable the user equipment 0320 to know how many beam receiving periods should be used to complete beam scanning, so that the user equipment 0320 can perform subsequent processing in time after those beam receiving periods elapse. For example, in the example of FIG. 6B, once after three beam receiving periods elapse, the user equipment 0320 can perform subsequent processing (e.g., feedback of the beam state indication to the base station 0310), without having to wait for 6 beams receiving periods as shown in FIG. 6A.

In addition, the user equipment 0320 can also infer that how many beams need to be transmitted by each antenna panel based on the configuration of antenna and the agreed rules. For example, in case of user equipment 0320 knows that the group of antenna panels 0410 includes three antenna panels, and agrees to equally allocate beam directions to be scanned by the group of antenna panels 0410 to the three antenna panels, the user equipment 0320 can infer from this that each antenna panel needs to transmit 3 scanning beams (assuming user equipment 0320 knows that the group of antenna panels 0410 is to scan 9 beam directions).

The base station 0310 can notify the user equipment 0320 of beam configuration information and/or configuration of antenna through downlink broadcast channel (PBCH) or higher layer signaling RRC. Here, the configuration of antenna includes grouping situation among respective antenna panels at the base station, for example, a Quasi Co-location situation. In addition, the above beam configuration information and/or configuration of antenna may also not to be transmitted from the base station 0310 to the user equipment 0320. For example, the user equipment 0320 can learn this information from communications with other user equipments, or this information can set in the factory configuration of the user equipment 0320.

Feedback of Beam State Indication

After determining channel state of one or more beams transmitted by the base station 0310, the user equipment 0320 may transmit beam state indication of the one or more beams to the base station 0310 to indicate channel state of the one or more beams. For example, beam state indication may include one or more of ID of a beam (e.g., the numbering of a beam; time-frequency resource indication (e.g., CSI-RS Resource Indicator, CRI) corresponding to a beam; the index of a port on a beam), CSI of a beam (e.g., reception quality of a beam (e.g. CQI)), channel direction of a beam (e.g., PMI), the rank for a channel of a beam (e.g., RI), and information related to channel matrix of a beam.

The beam state indication may include indication of one or more optimal beams to indicate one or more beams having the best reception quality (e.g., the highest RSRP) at the user equipment 0320. Thus, the base station 0310 can determine one or more antenna panels serving a target communication apparatus in a group of antenna panels comprising antenna panels corresponding to the optimal beams.

In addition, beam state indication may further include indication of one or more worst beams. Thus, the base station can reduce interference between individual users when determining serving antenna panels for multiple users respectively. For example, in order to reduce interference between a first user equipment and a second user equipment, antenna panels in a group of antenna panels corresponding to the worst beams fed back by the first user equipment may be allocated to the second user equipment.

Determination of Serving Antenna Panels

After receiving beam state indication from the user equipment 0320, the base station 0310 may determine the optimal beams (which may be the optimal $N_{BF}$ beams, $N_{BF}$ greater than or equal to 1) based on the beam state indication. The base station 0310 can establish a beam pair link (which can be $N_{BPL}$ beam pair links, $N_{BPL}$ is greater than or equal to 1) with the user equipment 0320 with the optimal beams, that is, perform beamforming with the optimal beams when transmitting signals to the user equipment 0320.

In 4G LTE, since there is only one antenna panel, it is not necessary to consider which antenna panel to use to transmit the optimal beams. In the case that there are multiple antenna panels in the base station 0310, however, it is necessary to consider which antenna panel(s) to use to transmit the optimal beams. Moreover, if the multiple antenna panels of the base station 0310 are divided into a plurality of groups of antenna panels, the grouping situation needs also to be considered when antenna panels are selected to transmit the optimal beams.

It is assumed that the optimal beams indicated by beam state indication from the user equipment 0320 is transmitted by the antenna panel 0411, and the antenna panel 0411 is in the group of antenna panels 0410. Since coherent transmission can be performed among any number of antenna panels in the group of antenna panels 0410, the base station 0310 can determine any number of antenna panels in the group of antenna panels 0410 as antenna panels serving the user equipment 0320.

In some embodiments, the base station 0310 can determine all of antenna panels in the group of antenna panels 0410 as antenna panels serving the user equipment 0320. In some other embodiments, the base station 0310 can determine a portion of antenna panels in the group of antenna panels 0410 as antenna panels serving the user equipment 0320. For example, the base station 0310 can determine the antenna panels 0411, 0412 in the group of antenna panels 0410 as antenna panels serving the user equipment 0320.

Accordingly, the determined antenna panels serving the user equipment 0320 may include the antenna panel 0411 that transmits the optimal beams during beam scanning phase, and may also include other antenna panels in the group of antenna panels 0410.

Determination of an Antenna Port

Some of the time-frequency resources transmitted by each antenna panel can be mapped to one or more antenna ports. When a reference signal is transmitted through an antenna port, it is actually transmitting the reference signal on the time-frequency resources corresponding to the antenna port. Since there is only one antenna panel in 4G LTE, its antenna ports are all mapped to time-frequency resources transmitted by the same antenna panel. However, when the base station 0310 determines to serve the user equipment 0320 via multiple antenna panels, it is necessary to consider for each antenna panel through which antenna port(s) to transmit reference signals. Therefore, after antenna panels serving the user equipment 0320 are determined, antenna ports serving the user equipment can be determined accordingly, that is, on which antenna ports to transmit reference signals.

Figure 7:
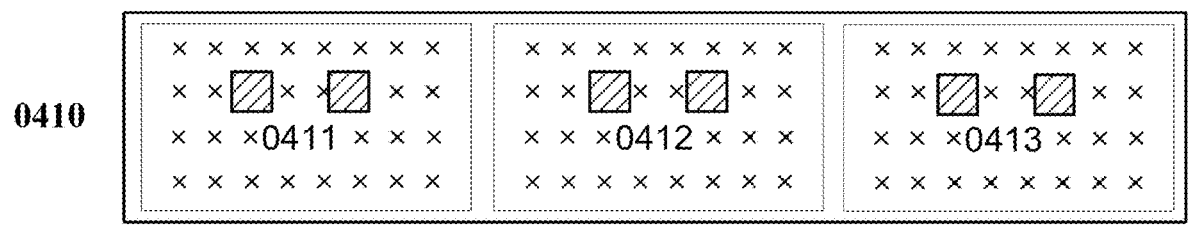
FIG. 7 illustrates a schematic diagram of an antenna port in accordance with one or more embodiments.

FIG. 7 illustrates a schematic diagram of an antenna port in accordance with one or more embodiments. In FIG. 7, each of the antenna panels 0411, 0412, 0413 is mapped to two antenna ports. Therefore, the antenna panels 0411, 0412, and 0413 are mapped to a total of 6 antenna ports. Assuming that the base station 0310 determines the antenna panels 0411, 0412, 0413 as antenna panels serving user equipment 0320, there are 6 antenna ports associated with the 3 antenna panels.

In some embodiments, the base station 0310 can use all antenna ports associated with antenna panels 0411, 0412, 0413 as antenna ports serving user equipment 0320. This scheme can make full use of the spatial freedom of multiple antennas.

In other embodiments, base station 0310 can remap antenna panels 0411, 0412, 0413 to a specified number of antenna ports as antenna ports serving the user equipment 0320. The specified number may be specified in the communication protocol or may be determined based on capability information provided by the user equipment 0320. This scheme may allow one port to correspond to more physical antennas so as to increase beamforming gain, improve channel measurement accuracy, and reduce changes to existing communication standards, thus ease of implementation.

The way to allocate antenna ports when serving user equipment 0320 via multiple antenna panels will be specifically described below with reference to FIGS. 8-9.

Figure 8A:
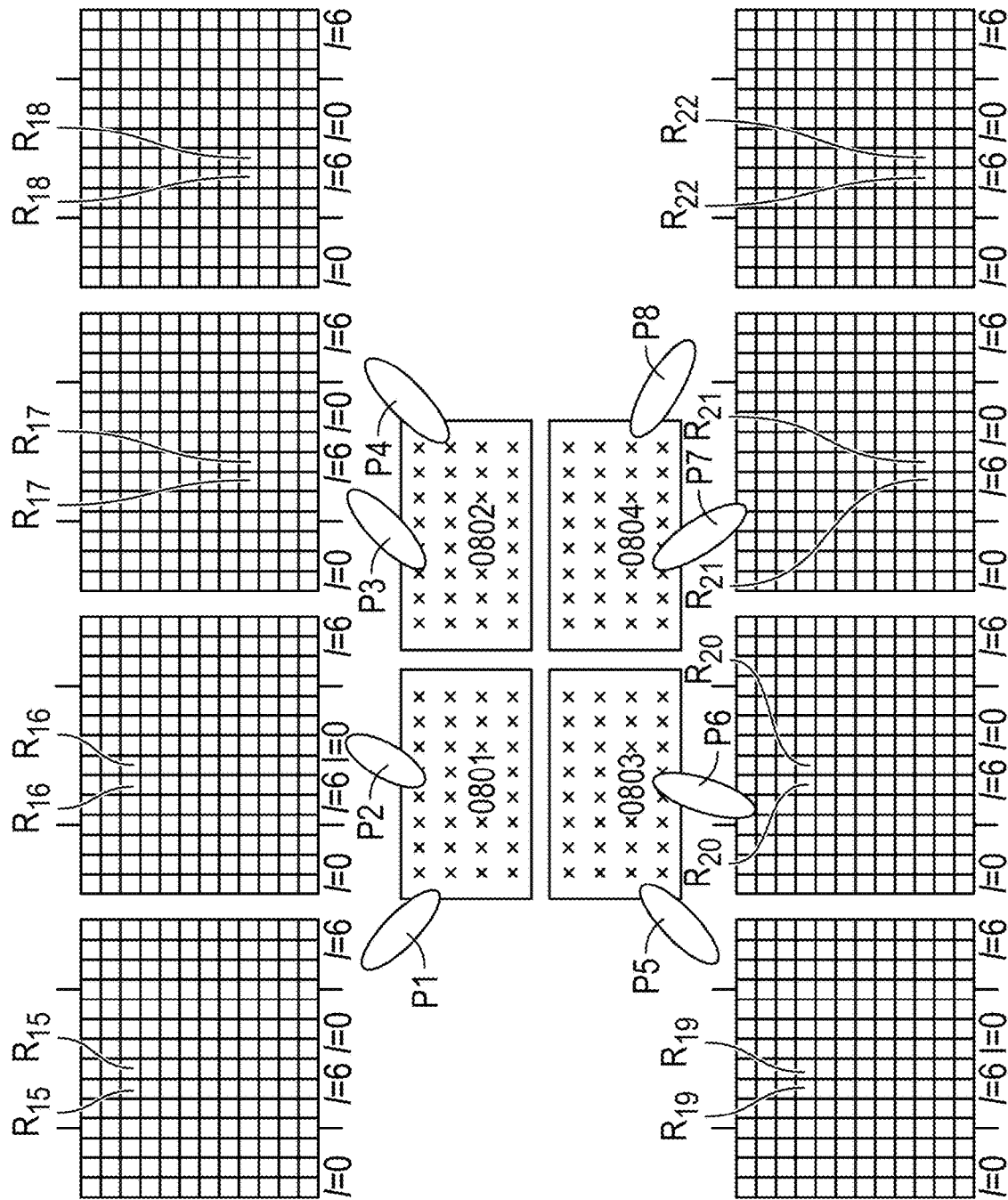
FIGS. 8A, 8B, 9A and 9B illustrate an exemplary scheme for allocating antenna ports when serving user equipments via multiple antenna panels.

FIG. 8A illustrates one mapping relationship between an antenna port and an antenna panel. In FIG. 8A, each of four antenna panels 0801-0804 is mapped to two antenna ports, that is, a total of eight antenna ports P1-P8. For example, the antenna panel 0801 is mapped to antenna ports P1 and P2. The time-frequency resources to which the antenna ports P1 and P2 are mapped are the same, and the reference symbols can be processed with an orthogonal mode such as an orthogonal code (for example, (+1, +1), (+1, −1)) in transmitting reference signals, so as to distinguish antenna ports P1 and P2. Similarly, antenna ports P3 and P4, P5 and P6, P7 and P8 can also be distinguished by orthogonal codes. For this case, the user equipment may include indexes of antenna ports to indicate different ports when feeding back.

Figure 8B:
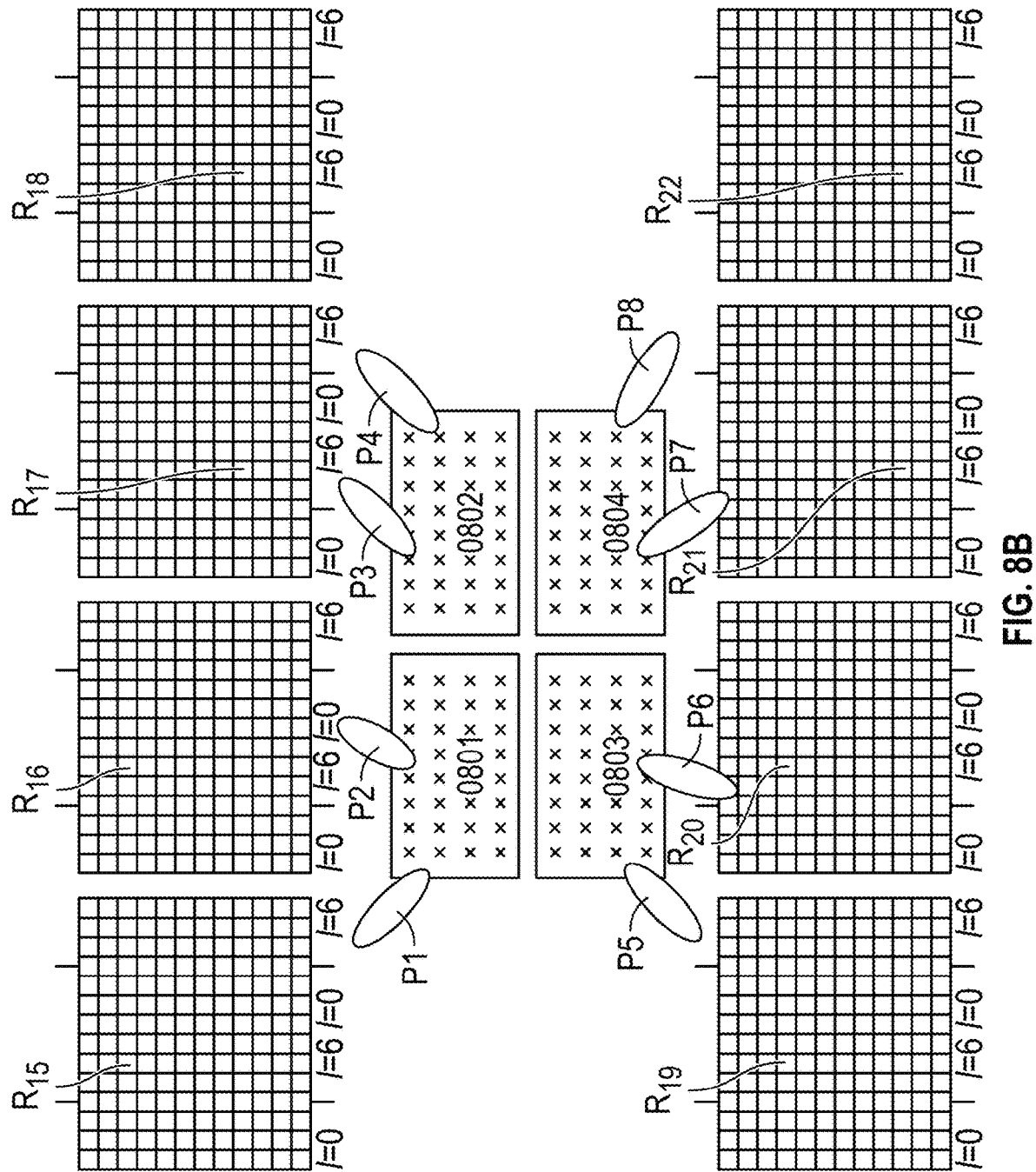

FIG. 8B illustrates another mapping relationship between an antenna port and an antenna panel. Similar to the case of FIG. 8A, in FIG. 8B, each of four antenna panels 0801-0804 is mapped to two antenna ports, that is, they are mapped to a total of eight antenna ports P1-P8. The difference from FIG. 8A is that the time-frequency resources to which the antenna ports P1 and P2 are mapped are different, so it is not necessary to distinguish antenna ports P1 and P2 with orthogonal codes. Similarly, antenna ports P3 and P4, P5 and P6, P7 and P8 may also need not to be distinguished by orthogonal codes. For this case, the user equipment may indicate different ports with time-frequency resource indicators (e.g., CRI) when feeding back.

Figure 9A:
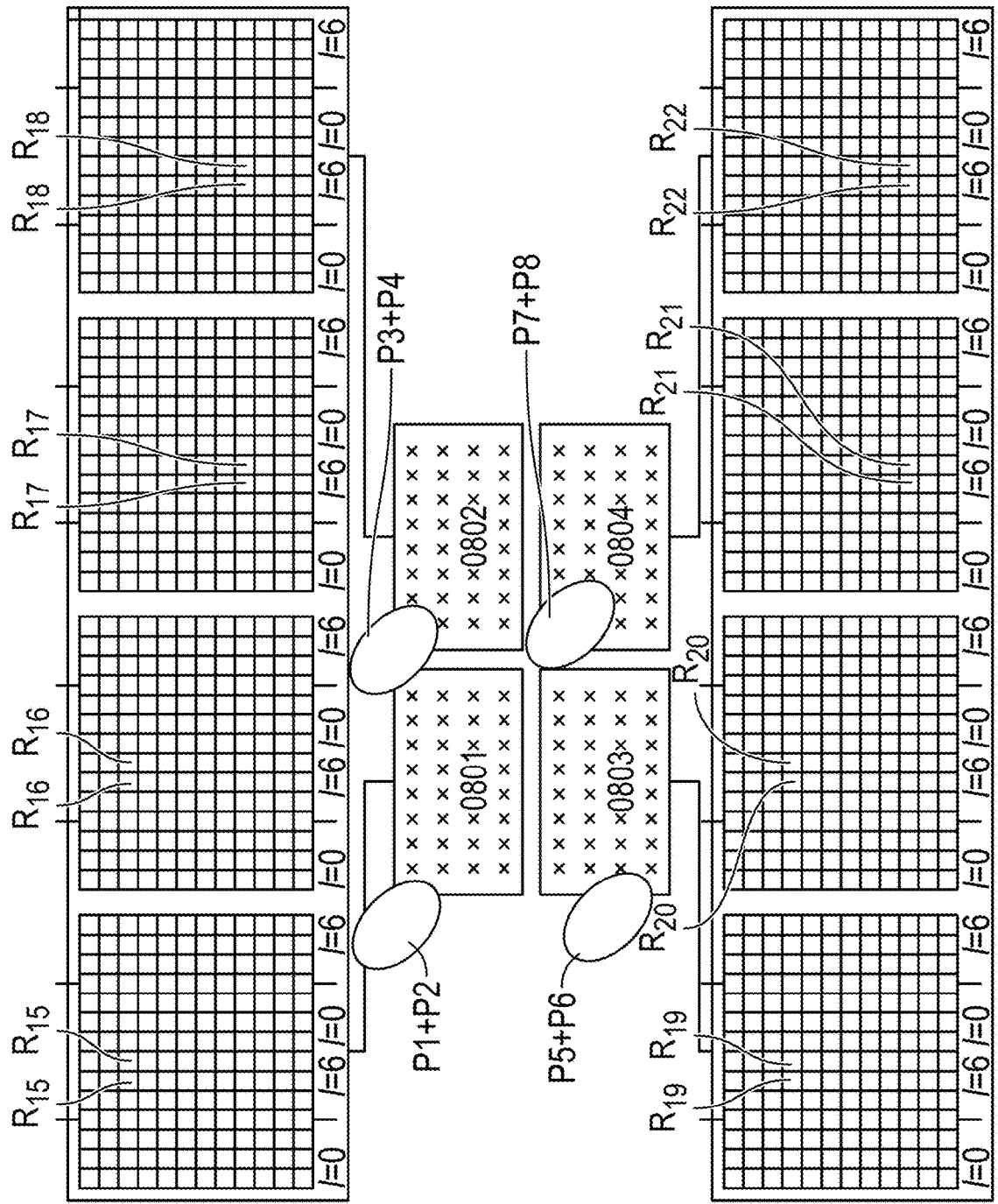

FIG. 9A illustrates an example of using all associated ports of an antenna panel serving a user equipment to serve the user equipment. In FIG. 9A, the base station 0310 uses all the 8 antenna ports P1-P8 as antenna ports serving the user equipment 0320. In this case, each antenna panel uses both of antenna ports associated with it to transmit reference signals when transmitting beams. For example, the antenna panel 0801 transmits reference signals via antenna ports P1 and P2 simultaneously, the antenna panel 0802 transmits reference signals via antenna ports P3 and P4 simultaneously, and the antenna panel 0803 transmits reference signals via antenna ports P5 and P6 simultaneously, and the antenna panel 0804 transmits reference signals via antenna ports P7 and P8 simultaneously.

Figure 9B:
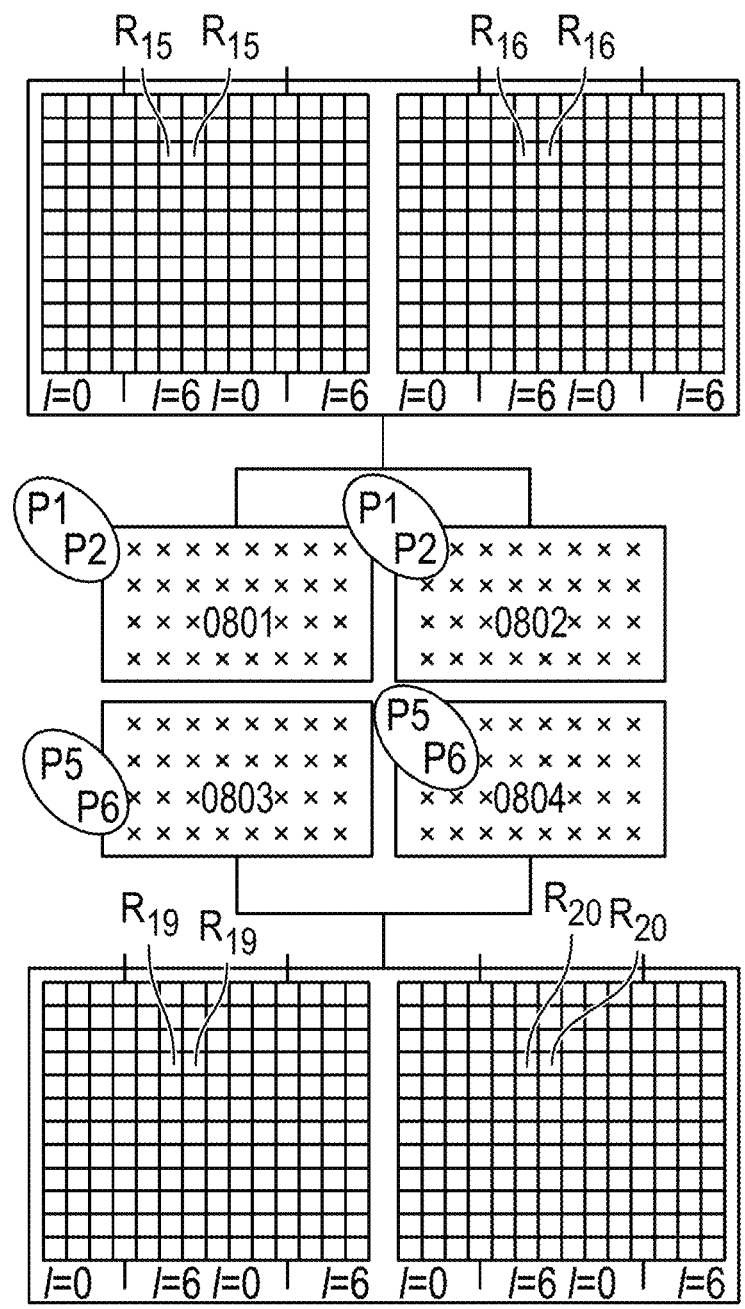

FIG. 9B illustrates an example of remapping an antenna panel serving user equipment to a specified number of antenna ports. For example, a base station can determine a number of antenna ports to be used for the user equipment according to receiving capabilities of the user equipment. In FIG. 9B, the base station 0310 remaps antenna panels 0801-0804 to 4 antenna ports as antenna ports serving the user equipment 0320. For example, the base station 0310 can arbitrarily select 4 antenna ports among the 8 antenna ports P1-P8 as antenna ports serving the user equipment 0320. For example, in FIG. 9B, the base station 0310 can select P1, P2, P5, and P6 to serve the user equipment 0320. Specifically, the antenna panels 0801 and 0802 both transmit reference signals through the antenna ports P1 and P2 when transmitting beams, and the antenna panels 0803 and 0804 both transmit reference signals through the antenna ports P5 and P6 when transmitting beams.

In addition, if antenna panels 0801-0804 establish multiple beam pair links with user equipment 0320, base station 0310 can remap antenna panels 0801-0804 to different antenna ports when communicating with user equipment 0320 using different beam pair links, so that these beam pair links can be distinguished. For example, when communicating with the beam pair link discussed above, the base station remaps the antenna panels 0801-0804 to antenna ports P1, P2, P5, P6, while the base station 0310 uses another beam pair link to communicate with the user equipment 0320, the antenna panels 0801-0804 can be remapped to the antenna ports P3, P4, P7, and P8 (ports P3, P4, P7, and P8 are selected to serve the user equipment 0320). Specifically, the antenna panels 0801 and 0802 both transmit reference signals through the antenna ports P3 and P4 when transmitting beams, and the antenna panels 0803 and 0804 both transmit the reference signals through the antenna ports P7 and P8 when transmitting beams. Since the time-frequency resources to which the antenna ports P1, P2, P5, and P6 are mapped are different from the time-frequency resources to which the antenna ports P3, P4, P7, and P8 are mapped, the two beam pair links can be distinguished by the time-frequency resources.

CSI Acquisition

After determining the optimal beams and the serving antenna panels, communication related to channel state information (CSI) acquisition can be performed between the base station 0310 and the user equipment 0320 to further learn channel state between them. The base station 0310 can acquire the channel state in a one-step approach or a two-step approach.

The two-step CSI acquisition approach consists of two phases. In the first phase, beam scanning is performed to determine the optimal beams for serving the user equipment 0320. In the second phase, reference signals are transmitted through the optimal beams for channel state estimation. While in the one-step CSI acquisition approach, beam scanning and transmission of reference signals for estimating channel state are performed synchronously.

Figure 10:
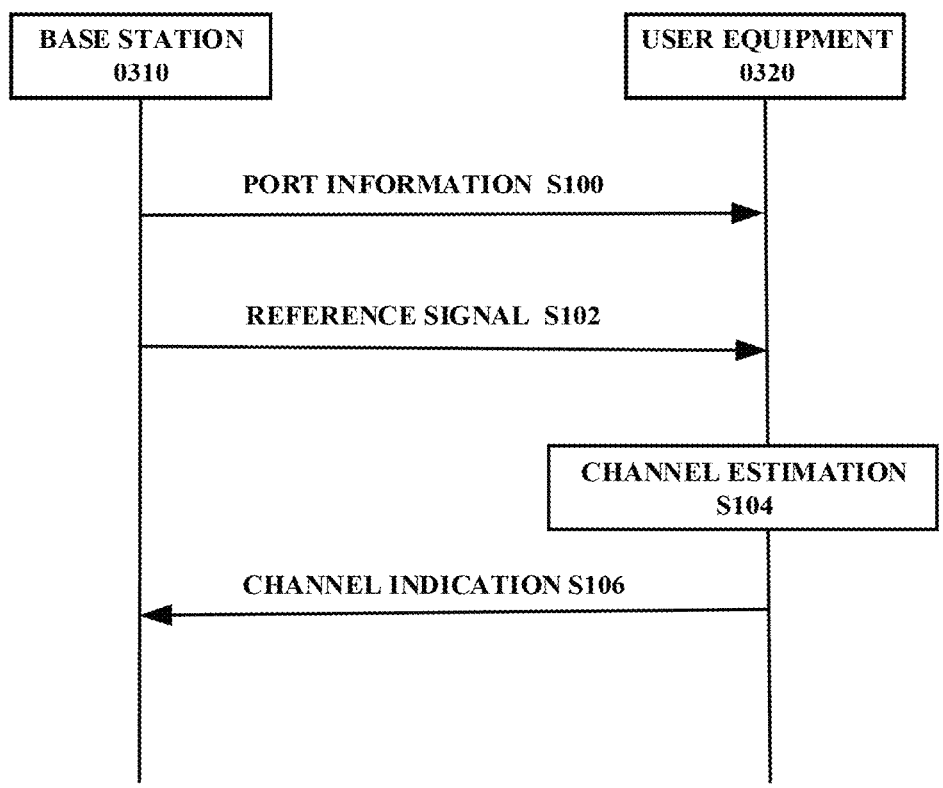
FIG. 10 illustrates a second phase of a two-step CSI acquisition approach in accordance with one or more embodiments.

FIG. 10 illustrates a second phase of a two-step CSI acquisition approach in accordance with one or more embodiments. At step S100, the base station 0310 transmits the determined port information of an antenna port serving the user equipment 0320 to the user equipment 0320. At step S102, the base station 0310 transmits reference signals to the user equipment 0320 through an antenna port serving the user equipment 0320. The reference signals transmitted through the antenna port serving the user equipment 0320 will actually be transmitted through the antenna panel associated therewith. Furthermore, the optimal beam for the user equipment 0320 has been determined in previous steps, so the reference signals can be transmitted by the antenna panel serving the user equipment 0320 with the optimal beam, so that the reception quality for the reference signals at the user equipment 0320 can be increased.

At step S104, the user equipment 0320 may determine, based on the received port information, on which time-frequency resources to detect the reference signals, and may determine channel state between the base station 0310 and the user equipment 0320 based on the detected reference signals. At step S106, the user equipment 0320 may feedback channel indication of the channel state to the base station 0310.

Figure 11A:
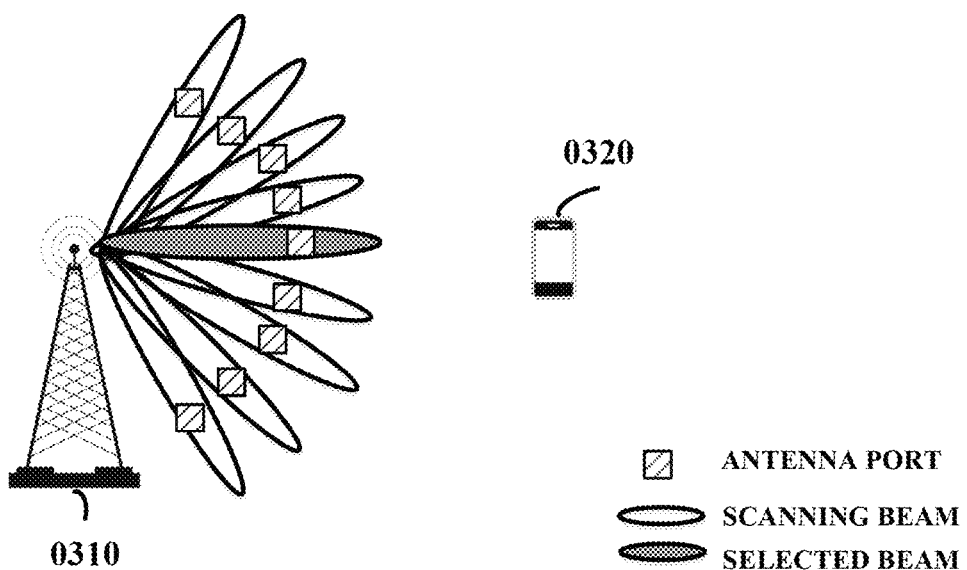
FIGS. 11A and 11B illustrate the usage of antenna ports in a two-step CSI acquisition approach.
Figure 11B:
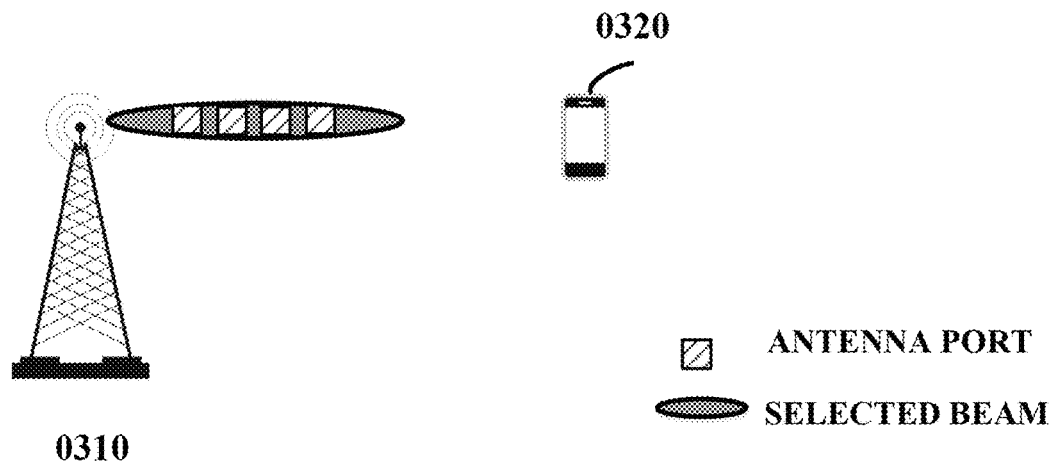

In the two-step CSI acquisition approach, since beam scanning and channel state estimation are performed separately, the number of antenna ports used for transmitting reference signals in the beam scanning phase may be small as long as the reception quality of each beam can be estimated. For example, when each scan beam is transmitted during the beam scanning phase, the reference signals can only be transmitted through one antenna port, as shown in FIG. 11A. While next, the reference signals are transmitted to estimate channel state, since it is desirable to be able to obtain a finer estimate of the channel, the reference signals can be transmitted through multiple antenna ports, as shown in FIG. 11B.

Figure 12:
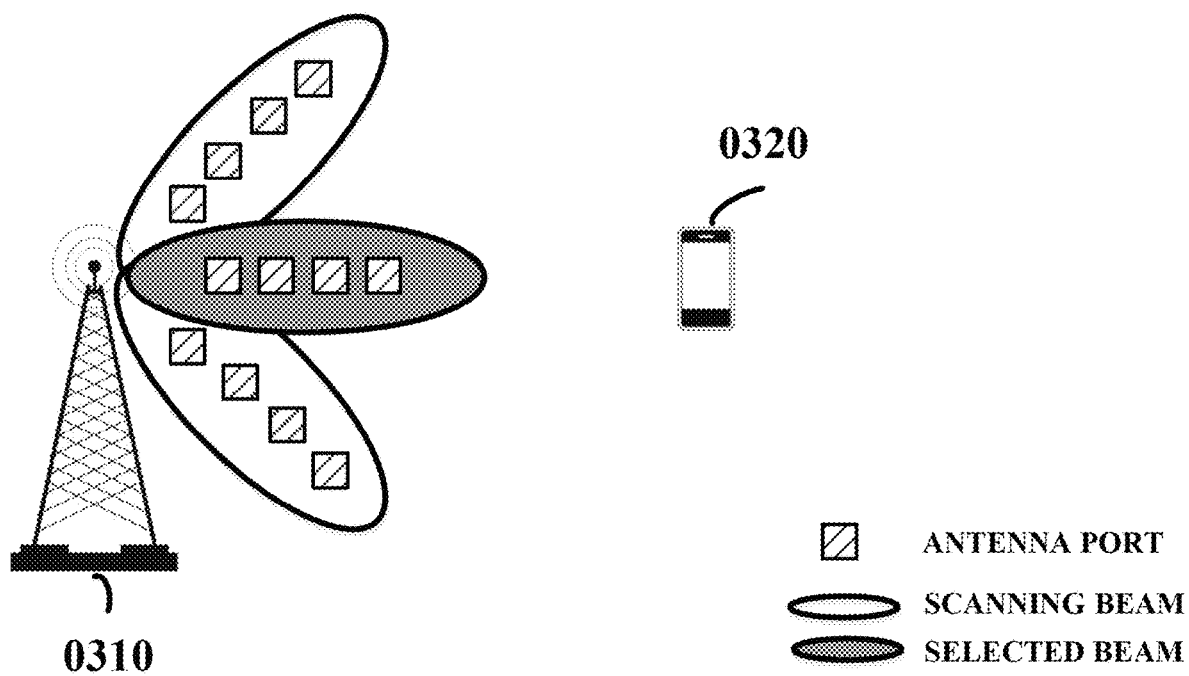
FIG. 12 illustrates the usage of antenna ports in a one-step CSI acquisition approach.

In the one-step CSI acquisition approach, the base station 0310 transmits reference signals through more antenna ports when transmitting each scanning beam, to obtain a fine estimate of the channel, as shown in FIG. 12. For example, in the beam scanning process shown in FIG. 3, the base station 0310 may transmit reference signals through more antenna ports when transmitting each scanning beam in step S030. The user equipment 0320 may estimate channel state based on these reference signals in step S032, and feedback the channel state included in beam state indication to the base station 0310 in step S034.

Determination of Transmission Scheme

After a beam pair link is established between the base station 0310 and the user equipment 0320, the transmission scheme between them can be determined based on channel state of the beam pair link.

In some embodiments, the user equipment 0320 can determine channel state of a beam based on the beam received from the base station 0310 and transmit transmission suggestion to the base station 0310 based on channel state of the beam. In other embodiments, the base station 0310 can determine a transmission scheme for the user equipment based on channel indication of channel state received from the user equipment 0320.

Figure 13A:
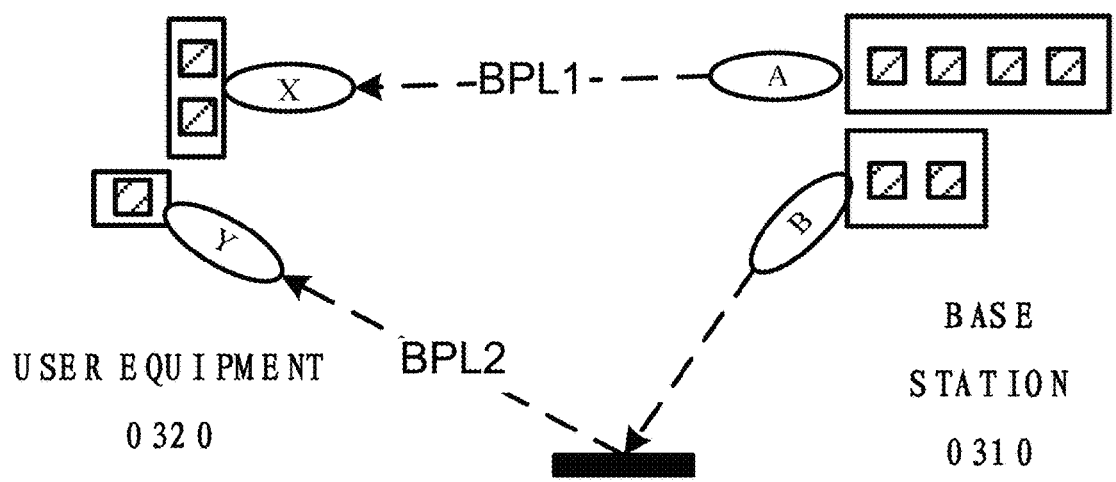
FIGS. 13A-13E illustrate examples of beam pair links between base stations and user equipments.

FIG. 13A illustrates an example of a beam pair link between a base station and a user equipment. In FIG. 13A, two transceiving beam pairs (i.e., beam pair links) are established between the base station 0310 and the user equipment 0320. The beam A of the base station 0310 is paired with the beam X of the user equipment 0320 to form a beam pair link BPL1; the beam B of the base station 0310 is paired with the beam Y of the user equipment 0320 to form a beam pair link BPL2. In some embodiments, the base station 0310 and the user equipment 0320 can use only one of the beam pair links to communicate, while the other beam pair link is used as a spare beam pair link. In some other embodiments, the base station 0310 and the user equipment 0320 can also communicate using both BPL1 and BPL2 at the same time. In addition, the number of beam pair links established between the base station 0310 and the user equipment 0320 is not limited to two, and may be one or more than two.

When communicating with a beam pair link, an equivalent channel matrix H can be constructed between the base station 0310 and the user equipment 0320. The transmission scheme between the base station 0310 and the user equipment 0320 can be determined based on the equivalent channel matrix H.

It is assumed that the base station 0310 and the user equipment 0320 communicate using BPL1 and BPL2 at the same time. In the example of FIG. 13A, there are 6 ports (equivalent to 6 transceiving units (TXRUs)) at the base station 0310 and 3 TXRUs at the user equipment 0320. Therefore, the equivalent channel matrix H is a 3×6 matrix. Assuming that the rank of the matrix H is k (k≤3), a k-way data stream can be transmitted between the base station 0310 and the user equipment 0320. The way to determine the transmission scheme according to the equivalent channel matrix H will be discussed below.

If there is no mutual interference/coherence (or with low mutual interference) between the two beam pair links (for example, the case shown in FIG. 13A), the equivalent channel matrix H is a diagonal block matrix formed by the channel matrix H1 of BPL1 and the channel matrix H2 of BPL2. Therefore, the two beam pair links can be used for parallel transmission, that is, BPL1 transmits $k_1$-way data stream ($k_1$ is the rank of H1), and BPL2 transmits $k_2$-way data stream ($k_2$ is the rank of H2), and it is not necessary to perform pre-coding between beams A and B of the base station 0310 to eliminate mutual interference between beam pair links BPL1 and BPL2.

Figure 13B:
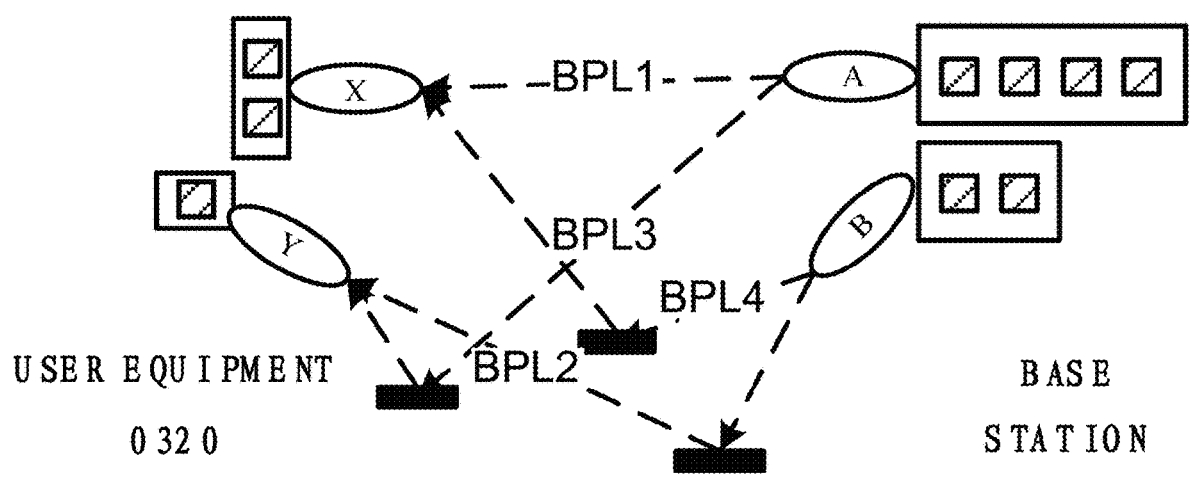

If there is mutual interference/coherence (or with high mutual interference) between the two beam pair links, then the two beam pair links can be used for spatial multiplexing, i.e., performing pre-coding between BPL1 and BPL2 to eliminate interference between the two beam pair links. A special case where there is mutual interference between two beam pair links is that one beam of the base station 0310 can establish beam pair links with multiple beams of the user equipment 0320, or multiple beams of the base station 0310 can establish beam pair links with the same beam of the user equipment 0320. For example, in the example of FIG. 13B, in addition to beam pair links BPL1, BPL2, beam pair links BPL3 and BPL4 may be established between beams A, B of the base station 0310 and beams X, Y of the user equipment 0320. Therefore, in this case, pre-coding between beams A, B of the base station 0310 is required to eliminate mutual interference between multiple beam pair links.

Figure 13C:
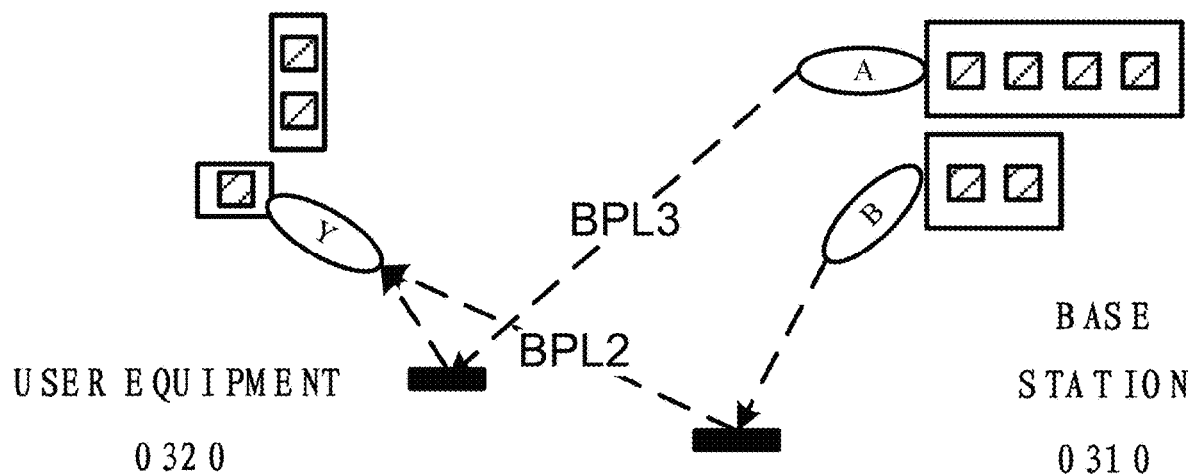

Assume that beam pair links BPL2, BPL3 are established between the base station 0310 and the user equipment 0320, as shown in FIG. 13C. Since the equivalent channel matrix H is a 1×6 matrix at this time, the rank of the matrix is 1. Therefore, only 1-way data stream can be transferred between the base station 0310 and the user equipment 0320. However, since there are 6 ports on the base station 0310 side, the base station 0310 can transfer data to the user equipment 0320 using Multiple Input Single Output scheme.

Figure 13D:
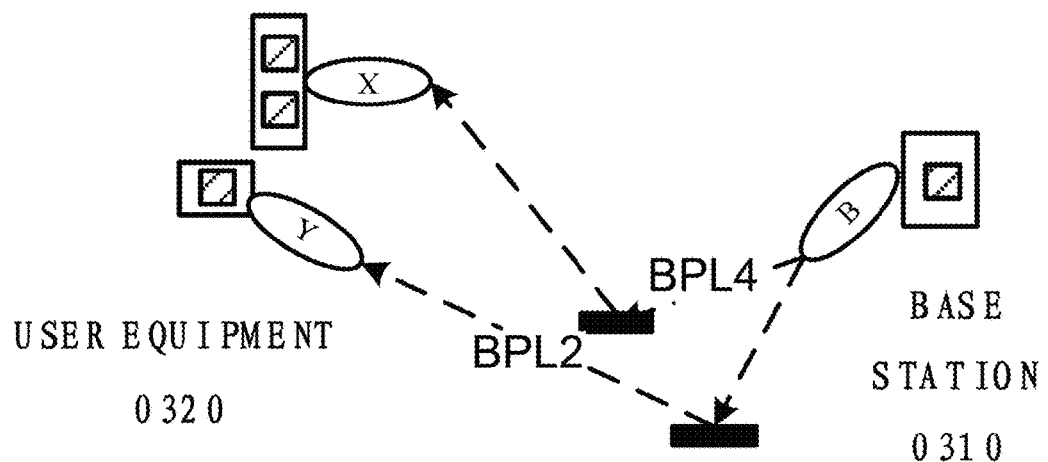

Assume that beam pair links BPL2, BPL4 are established between the base station 0310 and the user equipment 0320, as shown in FIG. 13D. In FIG. 13D, there is only one port on the base station 0310 side. Since the equivalent channel matrix H is a 3×1 matrix at this time, the rank of the matrix is 1. Therefore, only 1-way data stream can be transferred between the base station 0310 and the user equipment 0320. However, since there are 3 TXRUs on the user equipment 0320 side, the user equipment 0320 can receive data from the base station 0310 using Single Input and Multiple Output scheme.

Figure 13E:
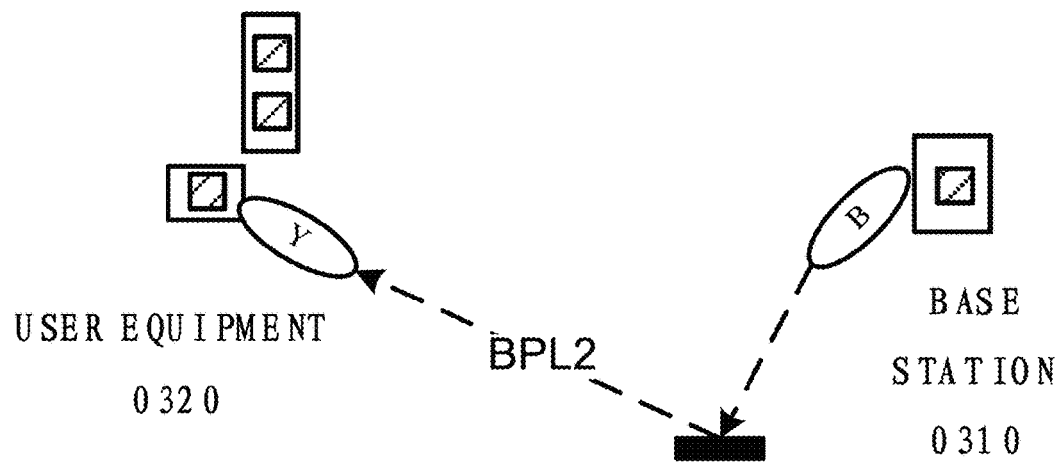

Finally, assume that the beam pair link BPL2 is established between the base station 0310 and the user equipment 0320, as shown in FIG. 13E. Since there is one port on the base station 0310 side at this time, and there is one TXRU on the user equipment 0320 side, the equivalent channel matrix H is a 1×1 matrix, and the rank of the matrix is 1. Therefore, only 1-way data stream can be transferred between the base station 0310 and the user equipment 0320. And only Single Input Single Output transmission (also known as single port transmission) can be performed, that is, Parallel Transmission, Spatial Multiplexing, Multiple Input Single Output, and Single Input and Multiple Output cannot be performed.

In summary, the user equipment 0320 can select a transmission scheme (Parallel Transmission, Spatial Multiplexing, Multiple Input Single Output, Single Input and Multiple Output, Single Input Single Output transmission) based on the equivalent channel matrix H, and transmit transmission suggestion to the base station 0310 to indicate the selected transmission scheme. Compared with the manner in which the base station unilaterally indicates to the user equipment which transmission scheme to perform and requires the user equipment to feedback channel state information under corresponding transmission scheme in the prior art, the examples of the present disclosure can better adapt to the variable channel situation caused by narrower beam coverage in 5G systems, providing the flow and signaling suggested by user equipment feedback transmission scheme, so that the base station performing central control can learn current approximate channel state for reasonable decision (including, for example, resource scheduling, multi-antenna processing) and specific channel state reporting configuration, and obtain a compromise between the amount of information and signaling overhead.

In addition, the user equipment 0320 may also transmit information related to the equivalent channel matrix H to the base station 0310. The base station 0310 can determine a transmission scheme for the user equipment 0320 based on information related to the equivalent channel matrix H. Information relating to the equivalent channel matrix H may be included in the beam state indication transmitted from the user equipment 0320 to the base station 0310.

Multi-User Scheme

In general case, there may be multiple user equipments simultaneously communicating with the base station 0310. The optimal beams fed back by the multiple user equipments may be emitted by the same group of antenna panels. Therefore, the problem of multi-user conflict could exist when selecting antenna panels for the multiple user equipments respectively. Therefore, a new scheme needs to be designed to solve this multi-user conflict problem.

Figure 14:
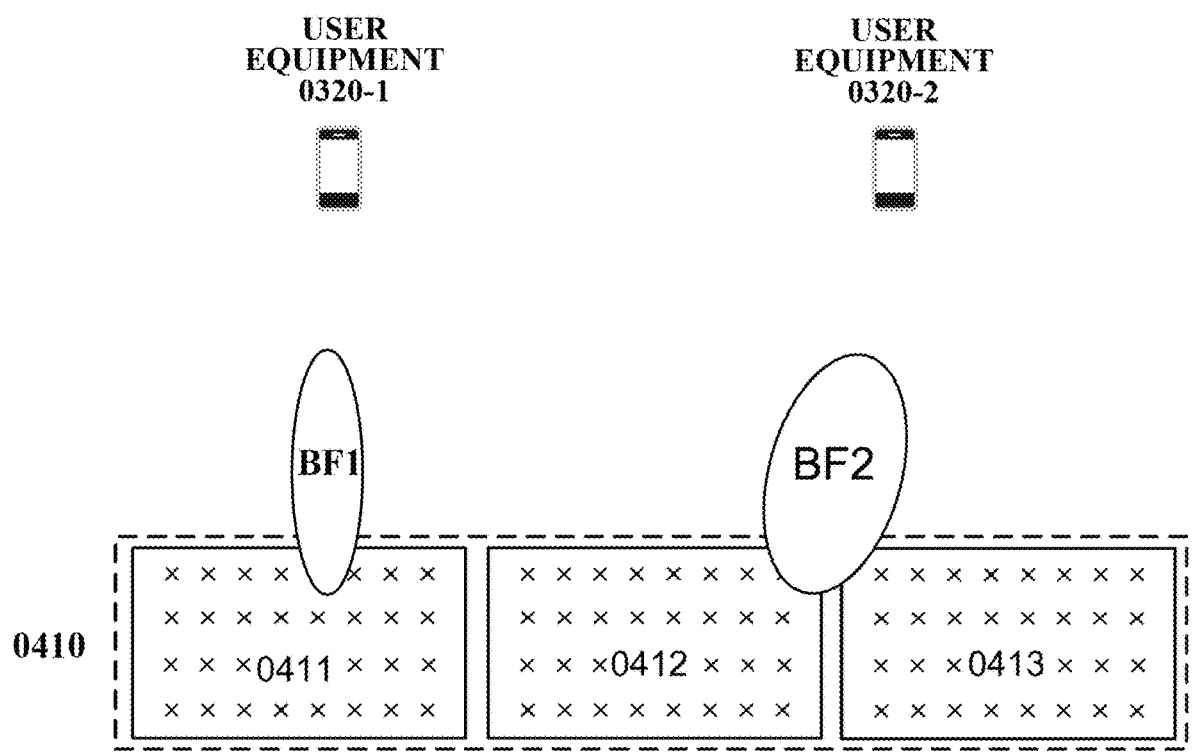
FIG. 14 illustrates a situation of multi-user conflicts in accordance with one or more embodiments.

FIG. 14 illustrates a situation of multi-user conflict in accordance with one or more embodiments. It is assumed that the user equipment 0320-1 and the user equipment 0320-2 are simultaneously communicating with the base station 0310, and that the optimal beams of the user equipment 0320-1 and the optimal beams of the user equipment 0320-2 are both emitted from the group of antenna panels 0410. According to one or more embodiments of the present disclosure, the base station 0310 may use a first portion of antenna panels in the group of antenna panels 0410 for serving the user equipment 0320-1, and use a second portion of antenna panels in the group of antenna panels 0410 for serving the user equipment 0320-2, wherein the first portion of antenna panels and the second portion of antenna panels do not overlap.

For example, in FIG. 14, the base station 0310 can use the antenna panel 0411 in the group of antenna panels 0410 for serving the user equipment 0320-1, and the antenna panels 0412 and 0413 in the group of antenna panels 0410 for serving the user equipment 0320-2. Here, the number of antenna panels allocated for the user equipment may be determined according to the specific needs of each user equipment or channel quality. For example, if the channel quality of user equipment 0320-2 is worse than the channel quality of user equipment 0320-1, a larger number of antenna panels may be allocated for user equipment 0320-2 to improve its communication quality. In addition, those skilled in the art can flexibly allocate antenna panels according to other communication requirements.

It is worth noting that, although the group of antenna panels 0410 serves both the user equipment 0320-1 and the user equipment 0320-2. However, beams serving the two user equipments can be different. For example, assuming the optimal beam of the user equipment 0320-1 is BF1 and the optimal beam of the user equipment 0320-2 is BF2, the beam BF1 can be transmitted via the antenna panel 0411 to communicate with the user equipment 0320-1, and the beam BF2 can be transmitted via the antenna panel 0412, 0413 to communicate with user equipment 0320-2.

APPLICATION EXAMPLES

Application Examples Regarding Base Stations

First Application Example

Figure 15:
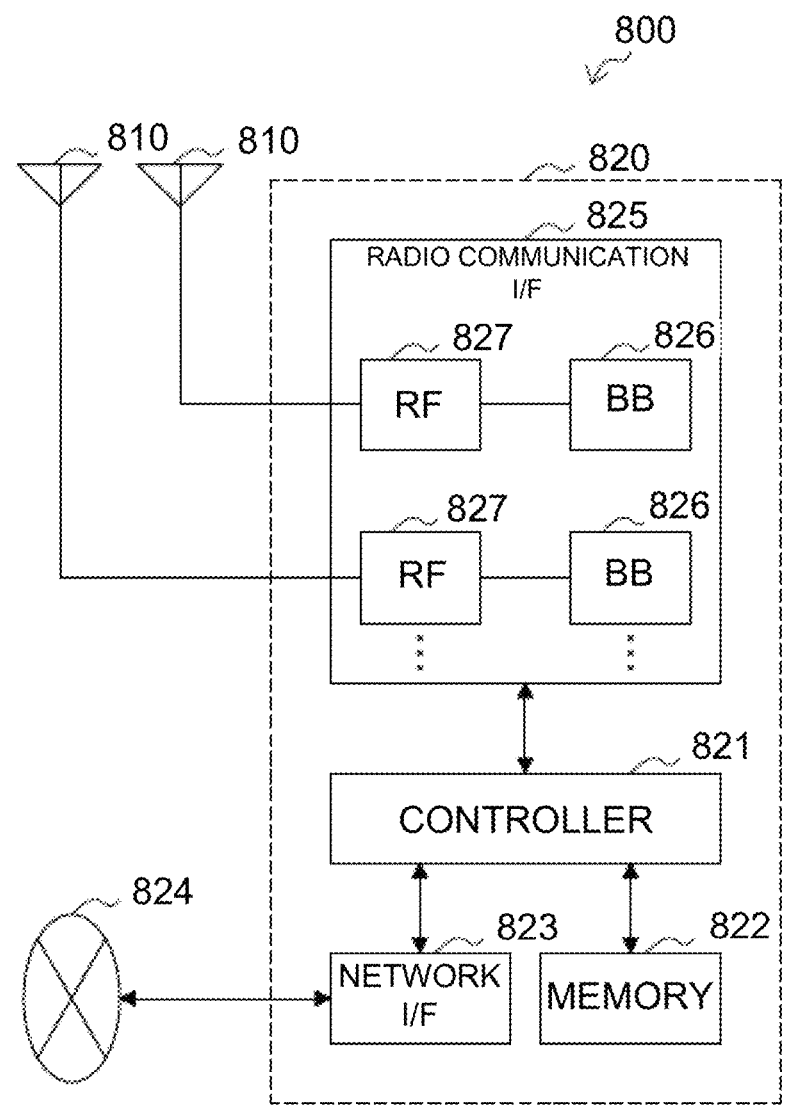
FIG. 15 is a block diagram illustrating a first example of a schematic configuration of an eNB.

FIG. 15 is a block diagram illustrating a first example of a schematic configuration of an eNB to which the technology of the present disclosure may be applied. An eNB 800 includes multiple antennas 810 and a base station device 820. The base station device 820 and each antenna 810 may be connected to each other via an RF cable.

Each of the antennas 810 includes a single or multiple antenna units (such as multiple antenna elements included in a multiple input multiple output (MIMO) antenna), and is used for the base station device 820 to transmit and receive wireless signals. As illustrated in FIG. 15, the eNB 800 may include multiple antennas 810. For example, the multiple antennas 810 can be compatible with multiple frequency bands used by the eNB 800. The multiple antennas 810 may be distributed across multiple antenna panels, as in the examples described in the disclosure.

The base station device 820 includes a controller 821, a memory 822, a network interface 823, and a radio communication interface 825.

The controller 821 may be, for example, a CPU or a DSP, and operates various functions of higher layers of the base station device 820. For example, the controller 821 generates a data packet from data in signals processed by the radio communication interface 825, and transfers the generated packet via the network interface 823. The controller 821 may bundle data from multiple base band processors to generate the bundled packet and transfer the generated bundled packet. The controller 821 may have logic functions of performing control such as radio resource control, radio bearer control, mobility management, admission control, and scheduling. This control may be performed in conjunction with an eNB or a core network node in the vicinity. The memory 822 includes RAM and ROM, and stores a program that is executed by the controller 821, and various types of control data (such as a terminal list, transmission power data, and scheduling data).

The network interface 823 is a communication interface for connecting the base station device 820 to a core network 824. The controller 821 may communicate with a core network node or another eNB via the network interface 823. In that case, the eNB 800, and the core network node or the other eNB may be connected to each other through a logical interface (such as an S1 interface and an X2 interface). The network interface 823 may also be a wired communication interface or a radio communication interface for radio backhaul. If the network interface 823 is a radio communication interface, the network interface 823 may use a higher frequency band for wireless communication than a frequency band used by the radio communication interface 825.

The radio communication interface 825 supports any cellular communication scheme such as Long Term Evolution (LTE) and LTE-Advanced, and provides radio connection to terminal positioned in a cell of the eNB 800 via the antenna 810. The radio communication interface 825 may typically include, for example, a baseband (BB) processor 826 and an RF circuit 827. The BB processor 826 may perform, for example, encoding/decoding, modulation/demodulation, and multiplexing/demultiplexing, and performs various types of signal processing of layers (such as L1, medium access control (MAC), radio link control (RLC), and packet data convergence protocol (PDCP)). The BB processor 826 may have a part or all of the above-described logical functions Instead of the controller 821. The BB processor 826 may be a memory that stores a communication control program, or a module that includes a processor and a related circuitry configured to execute the program. Updating the program may allow the functions of the BB processor 826 to be changed. The module may be a card or a blade that is inserted into a slot of the base station device 820. Alternatively, the module may also be a chip that is mounted on the card or the blade. Meanwhile, the RF circuit 827 may include, for example, a mixer, a filter, and an amplifier, and transmits and receives wireless signals via the antenna 810.

As illustrated in FIG. 15, the radio communication interface 825 may include the multiple BB processors 826. For example, the multiple BB processors 826 may be compatible with multiple frequency bands used by the eNB 800. As illustrated in FIG. 15, the radio communication interface 825 may include the multiple RF circuits 827. For example, the multiple RF circuits 827 may be compatible with multiple antenna elements. Although FIG. 15 illustrates the example in which the radio communication interface 825 includes the multiple BB processors 826 and the multiple RF circuits 827, the radio communication interface 825 may also include a single BB processor 826 or a single RF circuit 827.

Second Application Example

Figure 16:
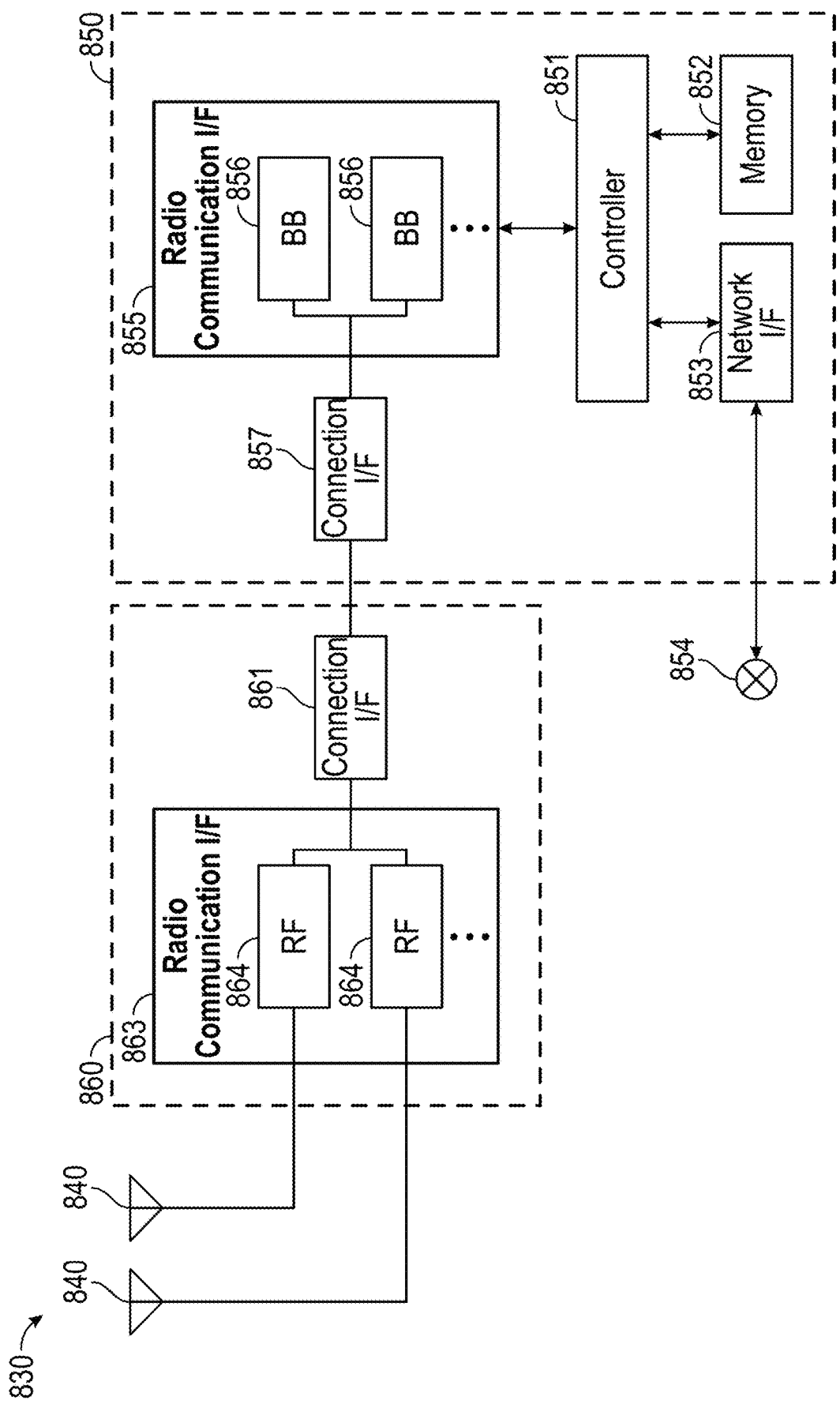
FIG. 16 is a block diagram illustrating a second example of a schematic configuration of an eNB.

FIG. 16 is a block diagram illustrating a second example of a schematic configuration of an eNB to which the technology of the present disclosure may be applied. An eNB 830 includes multiple antennas 840, a base station device 850, and an RRH 860. The RRH 860 and each antenna 840 may be connected to each other via an RF cable. The base station device 850 and the RRH 860 may be connected to each other via a high speed line such as an optic fiber cable.

Each of the antennas 840 includes a single or multiple antenna elements (such as multiple antenna elements included in a MIMO antenna) and is used for the RRH 860 to transmit and receive wireless signals. As illustrated in FIG. 16, the eNB 830 may include the multiple antennas 840. For example, the multiple antennas 840 may be compatible with multiple frequency bands used by the eNB 830. The multiple antennas 840 may be distributed across multiple antenna panels, as in the examples described in the disclosure.

The base station device 850 includes a controller 851, a memory 852, a network interface 853, a radio communication interface 855, and a connection interface 857. The controller 851, the memory 852, and the network interface 853 are the same as the controller 821, the memory 822, and the network interface 823 described with reference to FIG. 15.

The radio communication interface 855 supports any cellular communication scheme (such as LTE and LTE-Advanced) and provides wireless communication to a terminal positioned in a sector corresponding to the RRH 860 via the RRH 860 and the antenna 840. The radio communication interface 855 may typically include, for example, a BB processor 856. The BB processor 856 is the same as the BB processor 826 described with reference to FIG. 15, except that the BB processor 856 is connected to the RF circuit 864 of the RRH 860 via the connection interface 857. The radio communication interface 855 may include the multiple BB processors 856, as illustrated in FIG. 16. For example, the multiple BB processors 856 may be compatible with multiple frequency bands used by the eNB 830. Although FIG. 16 illustrates the example in which the radio communication interface 855 includes the multiple BB processors 856, the radio communication interface 855 may also include a single BB processor 856.

The connection interface 857 is an interface for connecting the base station device 850 (radio communication interface 855) to the RRH 860. The connection interface 857 may also be a communication module for communicating in the above-described high speed line that connects the base station device 850 (radio communication interface 855) to the RRH 860.

The RRH 860 includes a connection interface 861 and a radio communication interface 863.

The connection interface 861 is an interface for connecting the RRH 860 (radio communication interface 863) to the base station device 850. The connection interface 861 may also be a communication module for communication in the above-described high speed line.

The radio communication interface 863 transmits and receives wireless signals via the antenna 840. Radio communication interface 863 may typically include, for example, the RF circuit 864. The RF circuit 864 may include, for example, a mixer, a filter, and an amplifier, and transmits and receives wireless signals via the antenna 840. The radio communication interface 863 may include multiple RF circuits 864, as illustrated in FIG. 16. For example, the multiple RF circuits 864 may support multiple antenna elements. Although FIG. 16 illustrates the example in which the radio communication interface 863 includes the multiple RF circuits 864, the radio communication interface 863 may also include a single RF circuit 864.

In the eNB 800 and the eNB 830 illustrated in FIGS. 15 and 16, the radio communication interface 825 and the radio communication interface 855 and/or the radio communication interface 863 may be realized by using the processing circuitry 0212 described in FIG. 2. At least a portion of the functionality may also be realized by controller 821 and controller 851.

Application Examples Regarding User Equipments

First Application Example

Figure 17:
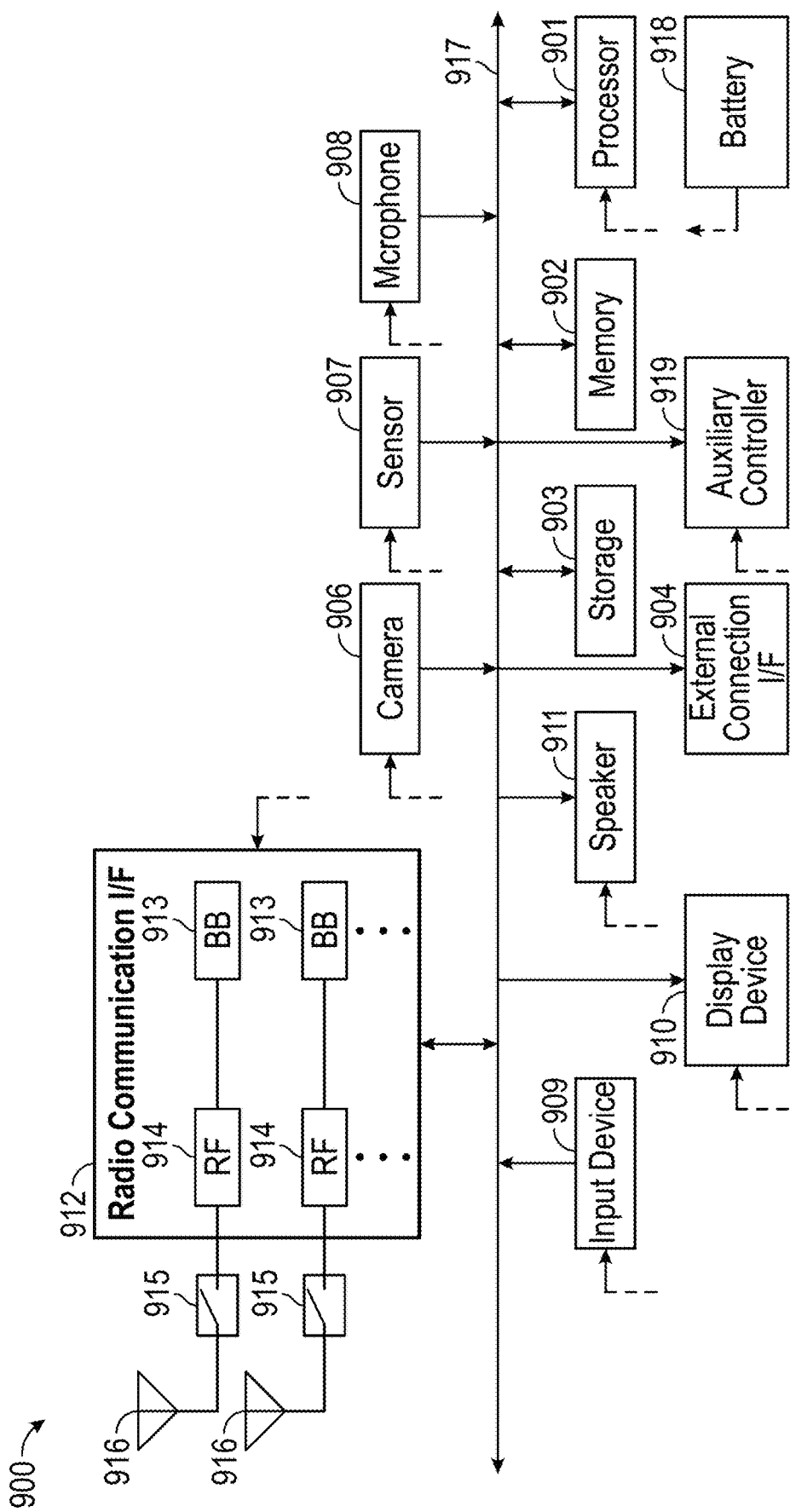
FIG. 17 is a block diagram illustrating an example of a schematic configuration of a smartphone.

FIG. 17 is a block diagram illustrating an example of a schematic configuration of a smartphone 900 to which the technology of the present disclosure may be applied. The smartphone 900 includes a processor 901, a memory 902, a storage 903, an external connection interface 904, a camera 906, a sensor 907, a microphone 908, an input device 909, a display device 910, a speaker 911, a radio communication interface 912, one or more antenna switches 915, one or more antennas 916, a bus 917, a battery 918, and an auxiliary controller 919.

The processor 901 may be, for example, a CPU or a system on a chip (SoC), and controls functions of an application layer and another layer of the smart phone 900. The memory 902 includes RAM and ROM, and stores data and a program that is executed by the processor 901. The storage 903 may include a storage medium such as a semiconductor memory and a hard disk. The external connection interface 904 is an interface for connecting an external device such as a memory card and a universal serial bus (USB) device to the smartphone 900.

The camera 906 includes an image sensor such as a charge coupled device (CCD) and a complementary metal oxide semiconductor (CMOS), and generates a captured image. The sensor 907 may include a group of sensors such as a measurement sensor, a gyro sensor, a geomagnetic sensor, and an acceleration sensor. The microphone 908 converts sounds that are input to the smartphone 900 to audio signals. The input device 909 includes, for example, a touch sensor configured to detect touch onto a screen of the display device 910, a keypad, a keyboard, a button, or a switch, and receives an operation or an information input from a user. The display device 910 includes a screen such as a liquid crystal display (LCD) and an organic light-emitting diode (OLED) display, and displays an output image of the smartphone 900. The speaker 911 converts audio signals that are output from the smartphone 900 to sounds.

The radio communication interface 912 supports any cellular communication scheme (such as LTE and LTE-Advanced) and performs wireless communication. The radio communication interface 912 may typically include, for example, a BB processor 913 and an RF circuit 914. The BB processor 913 may perform, for example, encoding/decoding, modulation/demodulation, and multiplexing/demultiplexing, and performs various types of signal processing for wireless communication. Meanwhile, the RF circuit 914 may include, for example, a mixer, a filter, and an amplifier, and transmits and receives wireless signals via the antenna 916. The radio communication interface 912 may be one chip module that has the BB processor 913 and the RF circuit 914 integrated thereon. The radio communication interface 912 may include the multiple BB processors 913 and the multiple RF circuits 914, as illustrated in FIG. 17. Although FIG. 17 illustrates the example in which the radio communication interface 912 includes the multiple BB processors 913 and the multiple RF circuits 914, the radio communication interface 912 may also include a single BB processor 913 or a single RF circuit 914.

Furthermore, in addition to a cellular communication scheme, the radio communication interface 912 may support another type of wireless communication scheme such as a short-distance wireless communication scheme, a near field communication scheme, and a wireless local area network (LAN) scheme. In that case, the radio communication interface 912 may include the BB processor 913 and the RF circuit 914 for each wireless communication scheme.

Each of the antenna switches 915 switches connection destinations of the antennas 916 among multiple circuits (such as circuits for different wireless communication schemes) included in the radio communication interface 912.

Each of the antennas 916 includes a single or multiple antenna elements (such as multiple antenna elements included in an MIMO antenna), and is used for the radio communication interface 912 to transmit and receive wireless signals. The smartphone 900 may include multiple antennas 916, as illustrated in FIG. 17. Although FIG. 17 illustrates the example in which the smartphone 900 includes the multiple antennas 916, the smartphone 900 may also include a single antenna 916.

Furthermore, the smart phone 900 may include the antenna 916 for each wireless communication scheme. In that case, the antenna switches 915 may be omitted from the configuration of the smartphone 900.

The bus 917 connects the processor 901, the memory 902, the storage 903, the external connection interface 904, the camera 906, the sensor 907, the microphone 908, the input device 909, the display device 910, the speaker 911, the radio communication interface 912, and the auxiliary controller 919 to each other. The battery 918 supplies power to blocks of the smart phone 900 illustrated in FIG. 17 via feeder lines, which are partially shown as dashed lines in the figure. The auxiliary controller 919 operates a minimum necessary function of the smartphone 900, for example, in a sleep mode.

In the smartphone 900 illustrated in FIG. 17, the radio communication interface 912 may be realized by using the processing circuitry 0212 described in FIG. 2. At least a portion of the functionality may also be realized by processor 901 or auxiliary controller 919.

Second Application Example

Figure 18:
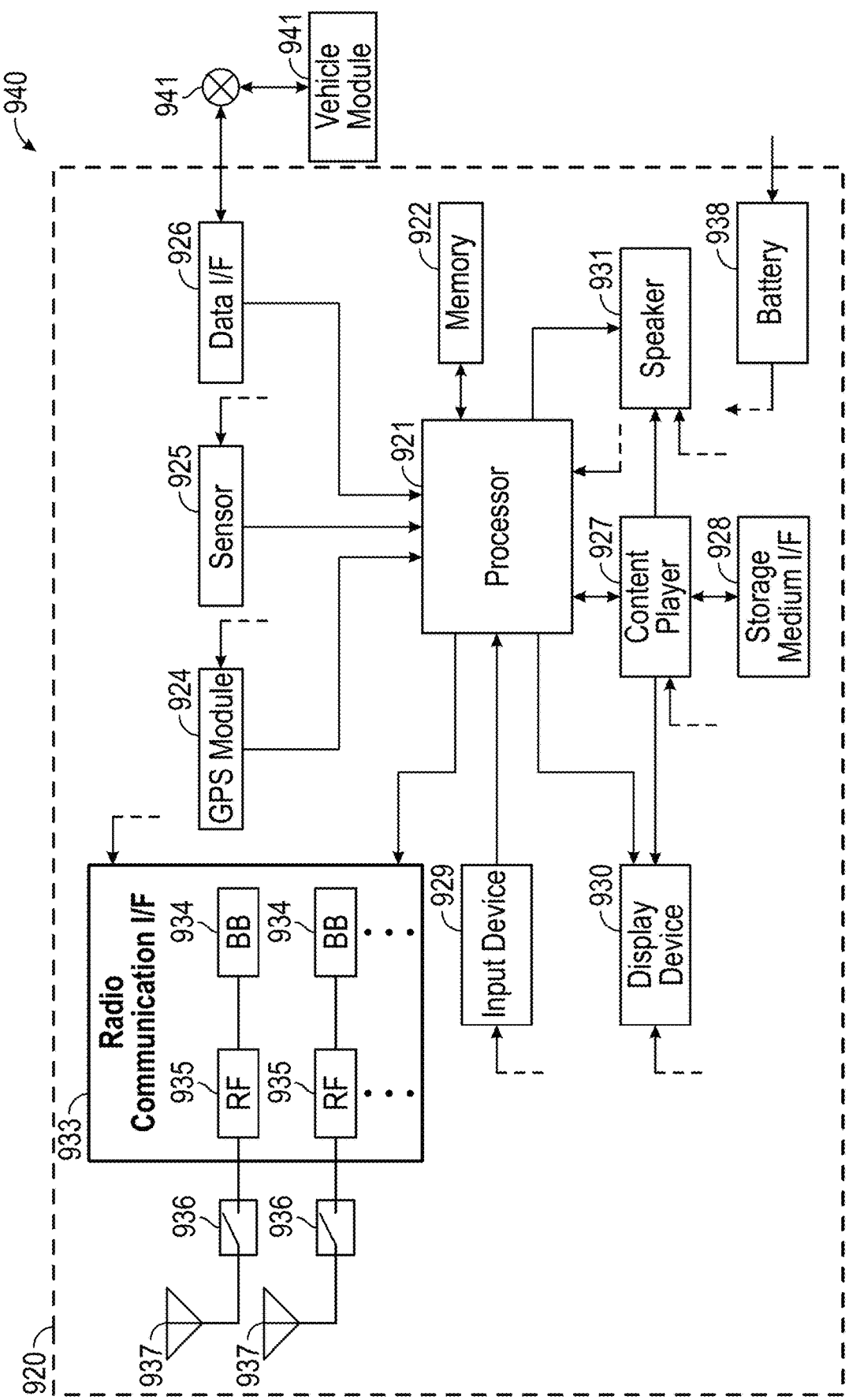
FIG. 18 is a block diagram illustrating an example of a schematic configuration of a car navigation device.

FIG. 18 is a block diagram illustrating an example of a schematic configuration of a car navigation device 920 to which the technology of the present disclosure may be applied. The car navigation device 920 includes a processor 921, a memory 922, a global positioning system (GPS) module 924, a sensor 925, a data interface 926, a content player 927, a storage medium interface 928, an input device 929, a display device 930, a speaker 931, and a radio communication interface 933, one or more antenna switches 936, one or more antennas 937, and a battery 938.

The processor 921 may be, for example, a CPU or a SoC, and controls a navigation function and another function of the car navigation device 920. The memory 922 includes RAM and ROM, and stores data and a program that is executed by the processor 921.

The GPS module 924 uses GPS signals received from a GPS satellite to measure a position (such as latitude, longitude, and altitude) of the car navigation device 920. The sensor 925 may include a group of sensors such as a gyro sensor, a geomagnetic sensor, and a barometric sensor. The data interface 926 is connected to, for example, an in-vehicle network 941 via a terminal that is not shown, and acquires data (such as vehicle speed data) generated by the vehicle.

The content player 927 reproduces content stored in a storage medium (such as a CD and a DVD) that is inserted into the storage medium interface 928. The input device 929 includes, for example, a touch sensor configured to detect touch onto a screen of the display device 930, a button, or a switch, and receives an operation or an information input from a user. The display device 930 includes a screen such as a LCD or an OLED display, and displays an image of the navigation function or content that is reproduced. The speaker 931 outputs sounds of the navigation function or the content that is reproduced.

The radio communication interface 933 supports any cellular communication scheme (such as LTE and LTE-Advanced) and performs wireless communication. The radio communication interface 933 may typically include, for example, a BB processor 934 and an RF circuit 935. The BB processor 934 may perform, for example, encoding/decoding, modulating/demodulating, and multiplexing/demultiplexing, and performs various types of signal processing for wireless communication. Meanwhile, the RF circuit 935 may include, for example, a mixer, a filter, and an amplifier, and transmits and receives wireless signals via the antenna 937. The radio communication interface 933 may also be one chip module having the BB processor 934 and the RF circuit 935 integrated thereon. The radio communication interface 933 may include the multiple BB processors 934 and the multiple RF circuits 935, as illustrated in FIG. 18. Although FIG. 18 illustrates the example in which the radio communication interface 933 includes the multiple BB processors 934 and the multiple RF circuits 935, the radio communication interface 933 may also include a single BB processor 934 or a single RF circuit 935.

Furthermore, in addition to a cellular communication scheme, the radio communication interface 933 may support another type of wireless communication scheme, such as a short-distance wireless communication scheme, a near-field communication scheme, and a wireless LAN scheme. In that case, the radio communication interface 933 may include the BB processor 934 and the RF circuit 935 for each wireless communication scheme.

Each of the antenna switches 936 switches connection destinations of the antennas 937 among multiple circuits (such as circuits for different wireless communication schemes) included in the radio communication interface 933.

Each of the antennas 937 includes a single or multiple antenna elements (such as multiple antenna elements included in an MIMO antenna) and is used for the radio communication interface 933 to transmit and receive wireless signals. The car navigation device 920 may include the multiple antennas 937, as illustrated in FIG. 18. Although FIG. 18 illustrates the example in which the car navigation device 920 includes the multiple antennas 937, the car navigation device 920 may also include a single antenna 937.

Furthermore, the car navigation device 920 may include the antenna 937 for each wireless communication scheme. In that case, the antenna switches 936 may be omitted from the configuration of the car navigation device 920.

The battery 938 supplies power to blocks of the car navigation device 920 illustrated in FIG. 18 via feeders lines that are partially shown as dashed lines in the figure. The battery 938 accumulates power supplied from the vehicle.

In the car navigation device 920 illustrated in FIG. 18, the radio communication interface 933 may be realized by using the processing circuitry 0212 described by FIG. 2. At least a portion of the functionality may also be realized by processor 921.

The technology of the present disclosure may also be realized as an in-vehicle system (or a vehicle) 940 including one or more blocks of the car navigation device 920, the in-vehicle network 941, and a vehicle module 942. The vehicle module 942 generates vehicle data such as vehicle speed, engine speed, and trouble information, and outputs the generated data to the in-vehicle network 941.

An apparatus in a communication system and a corresponding communication process method according to one or more embodiments of the present invention are described above.

Moreover, the order of processing flow and method flow described herein is not limited to the order described in the specification and the drawings. The order of some steps and flows may be exchanged or executed in parallel.

The detailed description set forth above in connection with the accompanying drawings describes examples, and is neither to denote the only examples that can be realized, nor denote the only examples within the scope of the claims. The words "example" and "exemplary", when used in the specification, mean "used as an example, instance or description," and does not mean "preferred" or "more beneficial than other examples." The detailed description includes specific details to provide an understanding of the described technologies. However, these technologies may be practiced without these specific details. In some instances, well known structures and apparatus are shown in the form of block in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with the present disclosure may be implemented or performed with a general purpose processor, a digital signal processor (DSP), an ASIC, an FPGA or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, and/or state machine. A processor may also be implemented as a combination of computing devices, e.g., a combination of a DSP and a microprocessor, a plurality of microprocessors, one or more microprocessors in conjunction with a DSP core, and/or any other such configuration.

The functions described herein may be implemented in hardware, software executed by a processor, firmware, or any combination thereof. If implemented in software executed by a processor, the functions may be stored on a computer readable medium or transmitted as one or more instructions or code on a computer readable medium. Other examples and implementations are within the scope and spirit of the disclosure and the appended claims. For example, in view of the nature of the software, the functions described above may be performed using software executed by a processor, hardware, firmware, hardwired, or any combination of thereof. Features that implement the functions may also be physically placed at various locations, including being distributed such that portion of the functionality are realized at different physical locations.

Furthermore, the disclosure of components contained within or separate from other components should be considered as exemplary, as various other architectures may potentially be realized to achieve the same functionality, including incorporation of all, a majority part of, and/or some of the elements as one or more single structures or a portion of a separated structure.

Computer readable media includes both computer storage media and communication media that includes any medium that facilitates transfer of a computer program from one place to another. A storage medium may be any available media that may be accessed by a general purpose or special purpose computer. By way of example and not limitation, a computer readable medium may comprise RAM, ROM, EEPROM, flash memory, CD-ROM, DVD or other optical disk storage, disk storage or other magnetic storage device, or any other medium that can be used to carry or store desired program code component in the form of instruction or data structure and that can be accessed by a general purpose or special purpose computer or a general purpose or special purpose processor. Also, any connection is appropriately referred to as a computer-readable medium. For example, if the software is transmitted from a website, server, or other remote source using coaxial cable, optic fiber cable, twisted pair, digital subscriber line (DSL), or wireless technologies such as infrared, radio, and microwave, then the coaxial cable, optical fiber cable, twisted pair, DSL, or wireless technologies such as infrared, radio, and microwave are included in the definition of the medium. Disks and discs as used herein include compact discs (CDs), laser discs, optical discs, digital versatile discs (DVDs), floppy discs, and Blu-ray discs, where the disk typically magnetically replicates data while the disc optically replicates data using a laser. Combinations of the above are also included within the scope of computer readable media.

The foregoing description of the disclosure is provided to enable a person skilled in the art to make or use the disclosure. The various modifications of the present disclosure will be apparent to those skilled in the art, and the general principles defined herein may be applied to other variations without departing from the scope of the present disclosure. Accordingly, the present disclosure is not limited to the examples and designs described herein, rather, it corresponds to the broadest scope consistent with the disclosed principles and novel features.

What is claimed is:

1. An electronic device for wireless communication comprising:
    processing circuitry configured to perform control to:
    transmit one or more beams through a plurality of antenna panels, wherein the plurality of antenna panels are divided into one or more groups of antenna panels for beam scanning;
    receive a beam state indication of the one or more beams from a plurality of target communication apparatuses;
    determine, for each of the plurality of target communication apparatuses, one or more antenna panels, in a group of antenna panels comprising an antenna panel corresponding to the beam state indication, serving a respective target communication apparatus of the plurality of target communication apparatuses, and
    in response to antenna panels corresponding to beam state indications received from a first target communication apparatus and a second target communication apparatus of the plurality of target communication apparatuses being in a same group of antenna panels, determine a first set of antenna panels in the same group of antenna panels serving the first target communication apparatus and determine a second set of antenna panels in the same group of antenna panels serving the second target communication apparatus, wherein the first set of antenna panels does not overlap with the second set of antenna panels.

2. The electronic device of claim 1, wherein each group of antenna panels comprises one or more antenna panels capable of performing coherent transmission.

3. The electronic device of claim 1, wherein one of the following:
    a direction of at least one beam transmitted by a first antenna panel in one group of antenna panels of the one or more groups of antenna panels is different from a direction of at least one beam transmitted by a second antenna panel in the one group of antenna panels, and a collection of beams transmitted by all antenna panels in the one group of antenna panels is able to accomplish beam scanning of the one group of antenna panels;
    a collection of beams to be transmitted by one group of antenna panels of the one or more groups of antenna panels to accomplish beam scanning is divided into multiple subsets, different subsets of the multiple subsets are transmitted by different antenna panels in the one group of antenna panels; or
    a collection of beams transmitted by at least one antenna panel in one group of antenna panels of the one or more groups of antenna panels are able to accomplish beam scanning of the one group of antenna panels.

4. The electronic device of claim 3, wherein each antenna panel is mapped to one or more antenna ports, wherein each beam is transmitted through one antenna port.

5. The electronic device of claim 1, wherein the one or more antenna panels serving the respective target communication apparatus comprise at least another antenna panel in the group of antenna panels that is different from the antenna panel corresponding to the beam state indication.

6. The electronic device of claim 1, wherein the processing circuitry is further configured to perform control to: set all antenna ports associated with the one or more antenna panels serving the respective target communication apparatus as antenna ports serving the respective target communication apparatus; or
  remap the one or more antenna panels serving the respective target communication apparatus to a specified number of antenna ports, and set the specified number of antenna ports as antenna ports serving the respective target communication apparatus.

7. The electronic device of claim 6, wherein the processing circuitry is further configured to perform control to: transmit port information of antenna ports serving the respective target communication apparatus to the respective target communication apparatus.

8. The electronic device of claim 6, wherein the processing circuitry is further configured to perform control to:
  transmit a reference signal to the respective target communication apparatus via the one or more antenna panels serving the respective target communication apparatus through the antenna ports serving the respective target communication apparatus; and
  receive a channel indication determined based on the reference signal from the respective target communication apparatus.

9. The electronic device of claim 8, wherein the processing circuitry is further configured to perform control to:
  determine a transmission scheme for the respective target communication apparatus based on the channel indication.

10. The electronic device of claim 1, wherein,
  the processing circuitry is further configured to perform control to:
  determine a transmission scheme for the respective target communication apparatus based on the beam state indication.

11. The electronic device of claim 1, wherein the processing circuitry is further configured to perform control to: transmit beam configuration information to the respective target communication apparatus, wherein the beam configuration information comprises at least a number of beams to be transmitted by each antenna panel in the one or more groups of antenna panels.

12. The electronic device of claim 1, wherein the beam state indication comprises indication of one or more optimal beams, and wherein the one or more antenna panels serving the respective target communication apparatus are determined in a group of antenna panels comprising antenna panels corresponding to the one or more optimal beams.

* * * * *